(12) United States Patent
Tenmyo

(10) Patent No.: US 6,981,775 B2
(45) Date of Patent: Jan. 3, 2006

(54) ILLUMINATION APPARATUS AND CAMERA

(75) Inventor: Yoshiharu Tenmyo, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 140 days.

(21) Appl. No.: 10/730,950

(22) Filed: Dec. 9, 2003

(65) Prior Publication Data
US 2004/0120135 A1    Jun. 24, 2004

(30) Foreign Application Priority Data
Dec. 13, 2002    (JP) ............................. 2002-362780

(51) Int. Cl.
G03B 15/02    (2006.01)
(52) U.S. Cl. ...................... 362/16; 362/268; 362/285; 362/296; 362/308; 362/328; 362/335
(58) Field of Classification Search ................. 362/16, 362/285, 17, 18, 268, 296, 308, 328, 335, 362/331, 284
See application file for complete search history.

(56) References Cited
U.S. PATENT DOCUMENTS
6,078,752 A * 6/2000 Tenmyo ...................... 396/176
6,282,027 B1 * 8/2001 Hough ........................ 359/618
6,471,375 B2 * 10/2002 Kobayashi et al. ......... 362/285

FOREIGN PATENT DOCUMENTS
JP  H4(1992)-138438   5/1992
JP  H8(1996)-262537   10/1996
JP       2000-298244   10/2000

* cited by examiner

Primary Examiner—John Anthony Ward
Assistant Examiner—Mark Tsidulko
(74) Attorney, Agent, or Firm—Cowan, Liebowitz & Latman, P.C.

(57) ABSTRACT

An illumination apparatus is disclosed, whose aperture portion can be made smaller while achieving miniaturization of the apparatus and higher condensing efficiency. The illumination apparatus comprising a light source, and a condensing unit that condenses light emitted from the light source toward the optical axis, wherein the condensing unit includes a negative lens portion that is arranged on a front side of the apparatus and has negative refractive power, a positive lens portion that is arranged near the optical axis and has positive refractive power, and a reflection portion that reflects emitted light that is not directed to the positive lens portion toward the optical axis.

3 Claims, 28 Drawing Sheets

ILLUMINATION APPARATUS AND CAMERA

BACKGROUND OF THE INVENTION

1. Field of the Invention

The present invention relates to illumination apparatuses as well as cameras equipped with an illumination apparatus, and in particular to illumination apparatuses, in which the length, in vertical direction of the apparatus, of the outgoing aperture portion through which light is emitted from the illumination apparatus is shortened without making the overall shape of the apparatus larger.

2. Description of Related Art

Illumination apparatuses used for cameras and the like are conventionally configured with a light source and an optical component such as a reflective mirror or Fresnel lens that guides the light rays emitted from the light source to the front of the apparatus (i.e. toward the object).

Regarding such illumination apparatuses, there have been various proposals for condensing the light rays that are emitted from the light source into various directions with high efficiency to the necessary illumination range. In particular in recent years, apparatuses have been proposed with which an improvement of the condensing efficiency as well as a miniaturization of the apparatus can be attained by placing an optical member utilizing total reflection, such as a prism light guide, instead of a Fresnel lens that is placed at the front of the apparatus with respect to the light source.

As one such apparatus, Japanese Patent Application Laid-Open No. H4 (1992)-138438 (referred to as "Document 1" in the following) discloses an illumination optical system that condenses light rays emitted from a light source to the front of the apparatus with a lens having positive refractive power, while directing the light rays that have been emitted from the light source toward the side of the apparatus to the front of the apparatus and condensing them by a total-reflection surface at which they are reflected, thereby irradiating illumination light from the same outgoing surface. That is to say, there are illumination optical systems using a prism making it possible to achieve miniaturization and increase the condensing efficiency, in which those of the light rays that are emitted from the light source whose optical path has been divided at an ingoing surface position of an optical member are emitted from the same outgoing surface, As an improvement of this illumination optical system, Japanese Patent Application Laid-Open No. H8 (1996)-262537 (referred to as "Document 2" in the following) proposes an apparatus in which miniaturization of the entire illumination optical system is achieved by placing the prism in front of the light source in the apparatus, and in which the surface of the prism that emits the totally reflected light is tilted with respect to the optical axis.

On the other hand, in illumination apparatuses of the type in which the irradiation angle range of the illumination light is fixed, in the tele state in which the necessary irradiation angle range is narrow as the image-taking optical system has been zoomed to a high zoom ratio, illumination light is irradiated onto an unnecessary range, which leads to a large energy loss. In order to address this problem and to eradicate the energy loss, several illumination apparatuses with variable irradiation angle have been proposed, with which the irradiation angle range of the illumination light can be changed in accordance with a change of the image-taking range (zooming of the image-taking optical system).

In one such illumination apparatus, the irradiation angle range of the illumination light is changed by moving a first optical member and a second optical member to change the spacing between them. More specifically, as disclosed in Japanese Patent Application Laid-Open No. 2000-298244 (referred to as "Document 3" in the following), the first optical member converts light rays emitted from the light source to the front of the apparatus into light rays of an optical axis direction, and includes a convex lens serving as a portion of the ingoing surface, a total reflection surface that converts light rays emitted from the light source to the side of the apparatus by total reflection into light rays of the optical axis direction, and an outgoing surface made of a plurality of small lenses.

The second optical member includes, on an ingoing surface onto which the light emitted from the first optical member is incident, a plurality of lenses that cancel the refractive power of the small lenses of the first optical member. Moreover, the irradiation angle range of the illumination light can be changed by moving the above-described first optical member and the second optical member relative to one another.

In recent years, as camera bodies become smaller, there is a need for making illumination optical systems that are mounted on the camera body and serves as an auxiliary light source even smaller. To address this, Documents 1 and 2 etc. propose illumination optical systems that strive for miniaturization and higher performance by using prisms of the above-described types.

On the other hand, in order to adapt to new camera designs, there is a strong demand for further improvements of these illumination optical systems, and in particular for a smaller aperture portion (in the vertical direction of the camera) serving as the light emission region that is apparent from the outside of the product (camera). That is to say, there is a demand for making only the aperture portion of the illumination apparatus smaller, while making the illumination apparatus smaller by using prisms as in the conventional technology, which is a very difficult demand that could not be realized with the prior art.

In the illumination optical systems of both Document 1 and Document 2, the portion where the total reflection surface is broadest serves as the opening (aperture) of the illumination optical system, and making the aperture portion smaller was not possible by a mere extension of the conventional approach without severely lowering the optical characteristics (light distribution characteristics).

Moreover, the demand to make the aperture portion of the illumination apparatus smaller is not restricted to the above-described illumination apparatuses in which the irradiation angle range of the illumination light is fixed, and the same demand is also strong for illumination apparatuses in which the irradiation angle range can be changed.

However, as can be understood from the illumination apparatus of the light-guide type disclosed in Document 3, the size of the aperture portion in conventional illumination apparatuses of the type with variable irradiation angle needs to be approximately the same size as the aperture portion (outgoing surface of the first optical member) that is formed by the portion where the total reflection surface is broadest, and the aperture portion of the illumination apparatus cannot be said to be sufficiently small. Also most of the other illumination apparatuses of the type with variable irradiation angle, the aperture portion of the illumination apparatus (optical member) needs to be much broader than the reflection screen for condensing, and by a mere extension of the conventional approach, a further miniaturization of the aperture portion is not possible without considerably lowering the optical characteristics.

SUMMARY OF THE INVENTION

It is thus the primary object of the present invention to provide an illumination apparatus, whose aperture portion can be made smaller while achieving miniaturization of the apparatus and higher condensing efficiency by using an optical member (prism). It is also an object of the present invention to provide an illumination apparatus with which uniform light distribution characteristics can be maintained on the irradiation surface, efficiently using the energy from the light source.

An illumination apparatus according to one aspect of the present invention includes a light source, comprising a light source, and a condensing unit that condenses light emitted from the light source toward the optical axis, wherein the condensing unit includes a negative lens portion that is arranged on a front side of the apparatus and has negative refractive power, a positive lens portion that is arranged near the optical axis and has positive refractive power, and a reflection portion that reflects emitted light that is not directed to the positive lens portion toward the optical axis.

A camera according to one aspect of the present invention includes such an illumination apparatus.

These and further objects and features of the scanning display optical system of the present invention will become apparent from the following detailed description of preferred embodiments thereof taken in conjunction with the accompanying drawings.

DETAILED DESCRIPTION OF THE PREFERRED EMBODIMENTS

The following is a detailed description of embodiments of the present invention, with reference to the accompanying drawings.

Embodiment 1

Referring to the accompanying drawings, the following is a description of an illumination apparatus according to Embodiment 1 of the present invention. FIGS. 1 to 6 are drawings illustrating the illumination apparatus of this embodiment, in particular a flashlight emitting apparatus. The flashlight emitting apparatus of this embodiment is of the type with fixed illumination angle.

Figure 1:
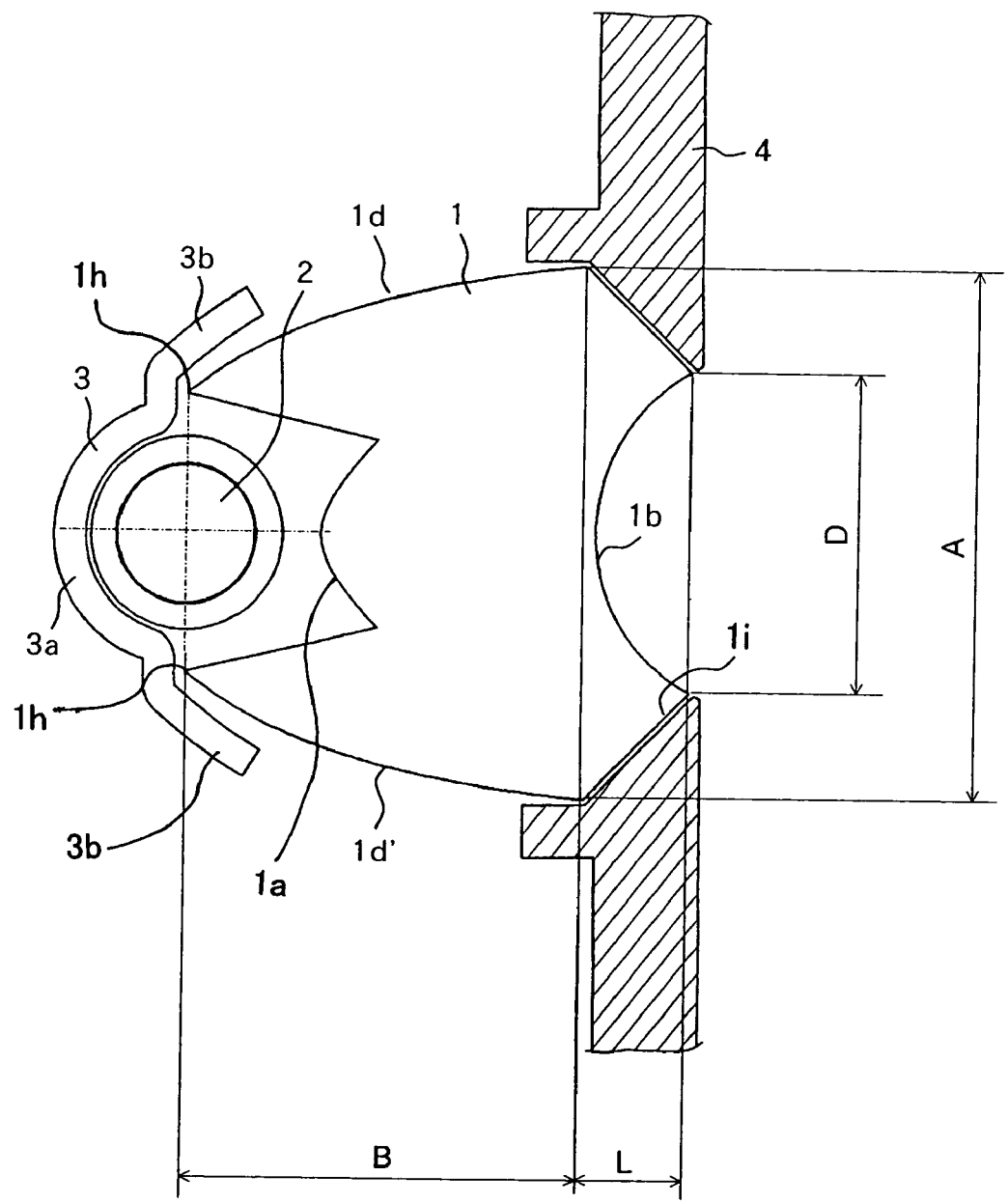
FIG. 1 is a cross-sectional view through the center of a flashlight emitting apparatus according to Embodiment 1 of the present invention, taken along the radial direction of the flashlight discharge tube.
Figure 2:
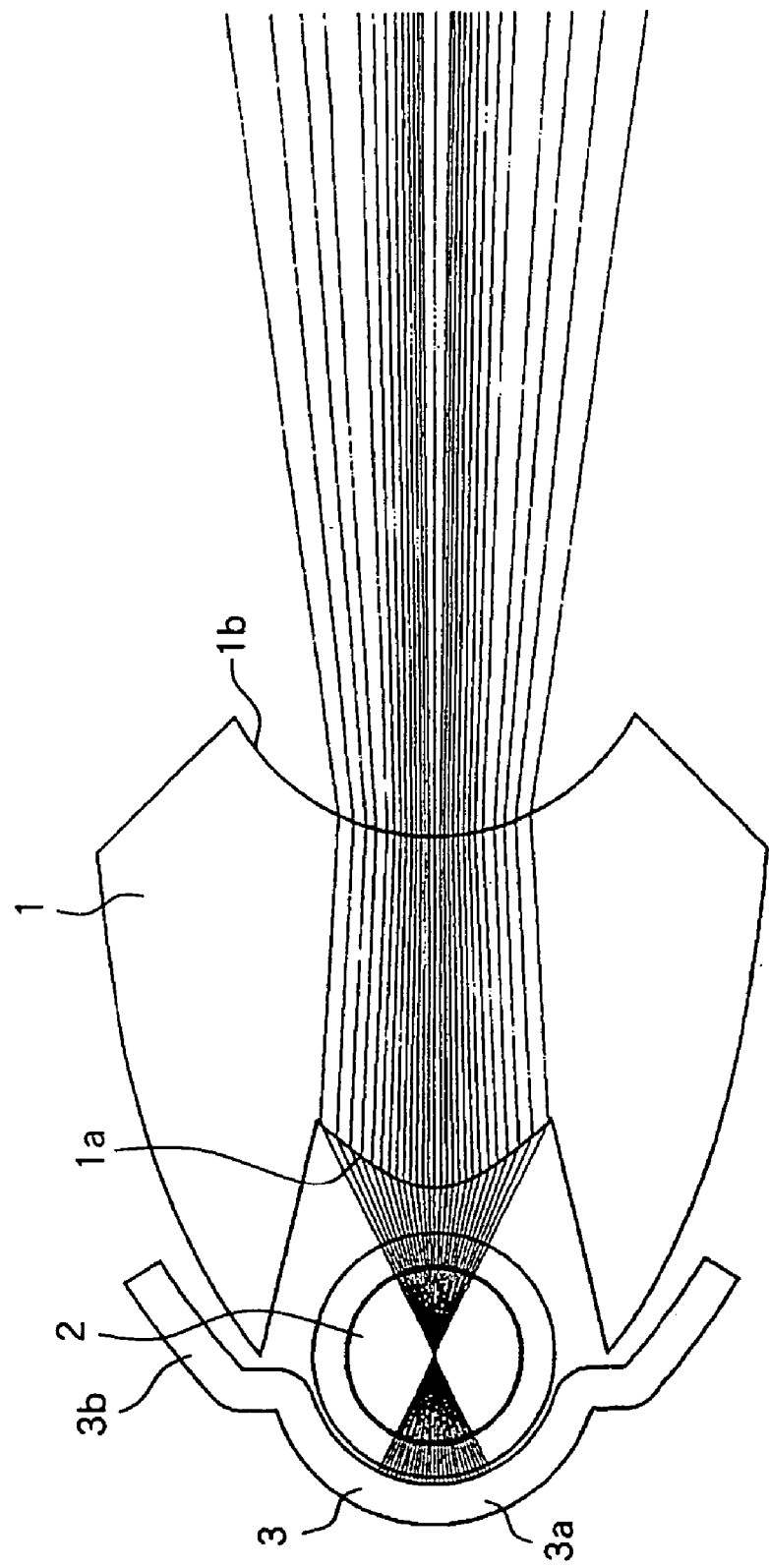
FIG. 2 is a diagram showing the distribution of light rays from the light source in Embodiment 1 of the present invention.
Figure 3:
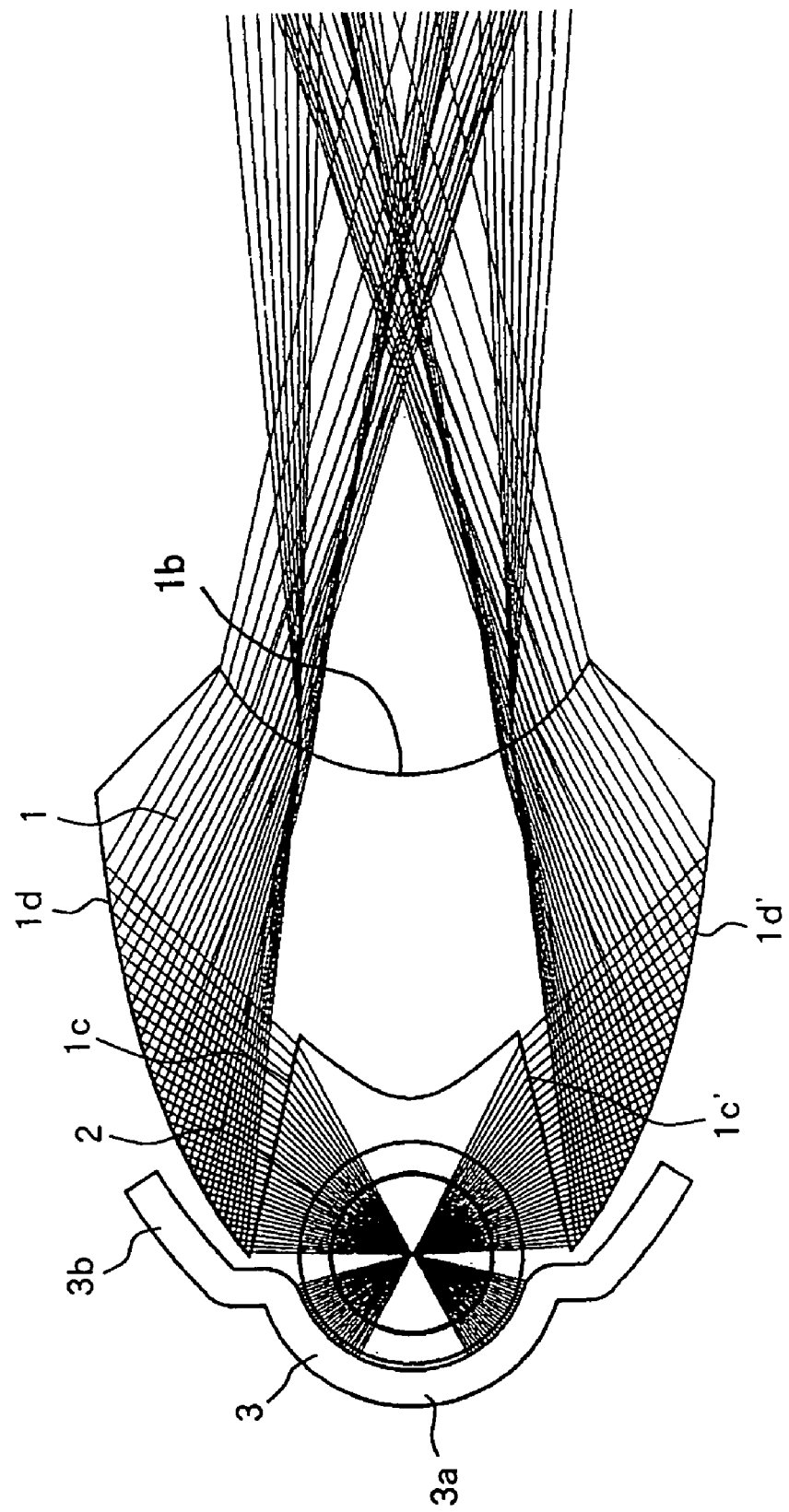
FIG. 3 is a diagram showing the distribution of light rays from the light source in Embodiment 1 of the present invention.
Figure 4:
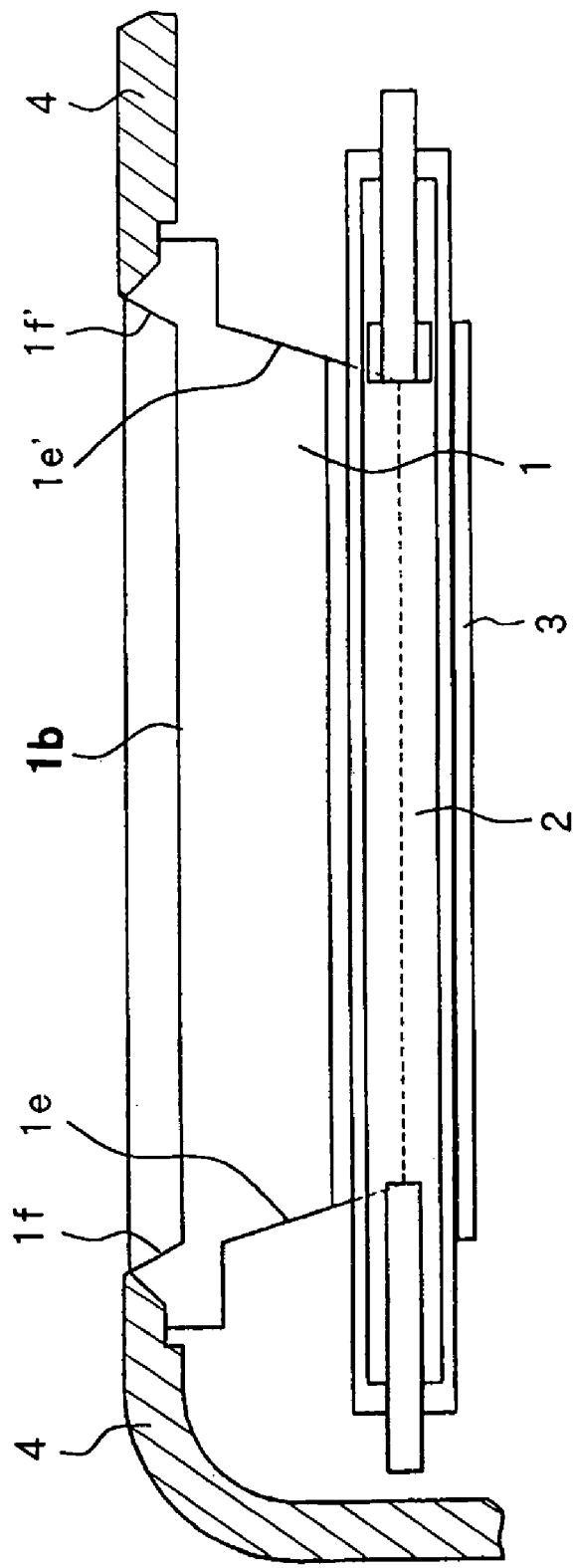
FIG. 4 is a cross-sectional view of a flashlight emitting apparatus according to Embodiment 1 of the present invention, taken along the longitudinal direction of the flashlight discharge tube.

FIG. 1 is a cross-sectional view of the flashlight emitting apparatus, along the radial direction of the flashlight discharge tube. FIGS. 2 and 3 are diagrams in which ray tracing of the light emitted from the light source center has been added to the cross-sectional view of FIG. 1. FIG. 4 is a cross-sectional view of a flashlight emitting apparatus along the longitudinal direction of the flashlight discharge tube. Moreover, FIG. 5 is an exploded perspective view showing the structure of the essential components of the flashlight emitting apparatus, and FIG. 6 is an external perspective view of a camera equipped with the flashlight emitting apparatus.

Figure 6:
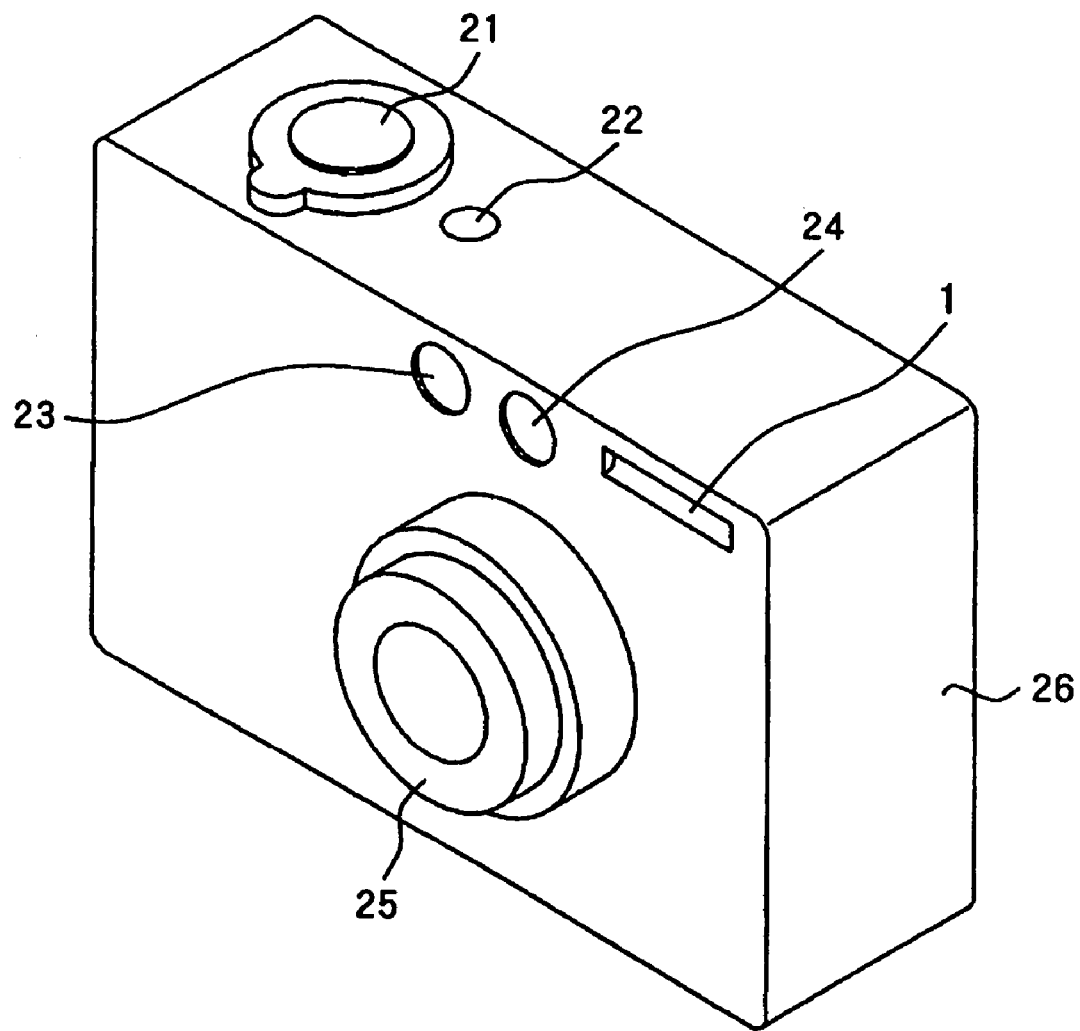
FIG. 6 is an external perspective view of a camera equipped with the flashlight emitting apparatus according to Embodiment 1 of the present invention.

In FIG. 6, numeral 1 denotes an optical prism arranged inside the flashlight emitting apparatus, which converts, in the manner described below, light rays emitted from the light source into light rays having a predetermined angular range. Numeral 21 indicates a release button. Pressing this release button 21 half down initiates an image-taking preparation operation (focus adjustment operation and light metering operation etc.), and pressing it down entirely initiates an image-taking operation (exposure of film or exposure of an image pickup element, such as a CCD, and recording of image data that have been read from the image pickup element onto a recording medium). Numeral 22 denotes a power source switch of the camera, and numeral 23 denotes a window portion that is arranged at the camera front in a finder optical system through which the object is observed.

Numeral 24 denotes a window portion of a light metering device that measures the brightness of external light. Numeral 25 denotes a lens barrel provided with an image-taking lens, allowing zooming of the image-taking optical system by advancing and retracting in the direction of the image-taking optical axis. Numeral 26 denotes a camera body, in which the necessary components for image-taking are arranged. It should be noted that the function of the other of the above-mentioned components besides the flashlight emitting apparatus are as known in the art, so that a further detailed explanation thereof has been omitted. Also, there is no limitation to the above-described structure of the components in the camera of this embodiment.

Figure 5:
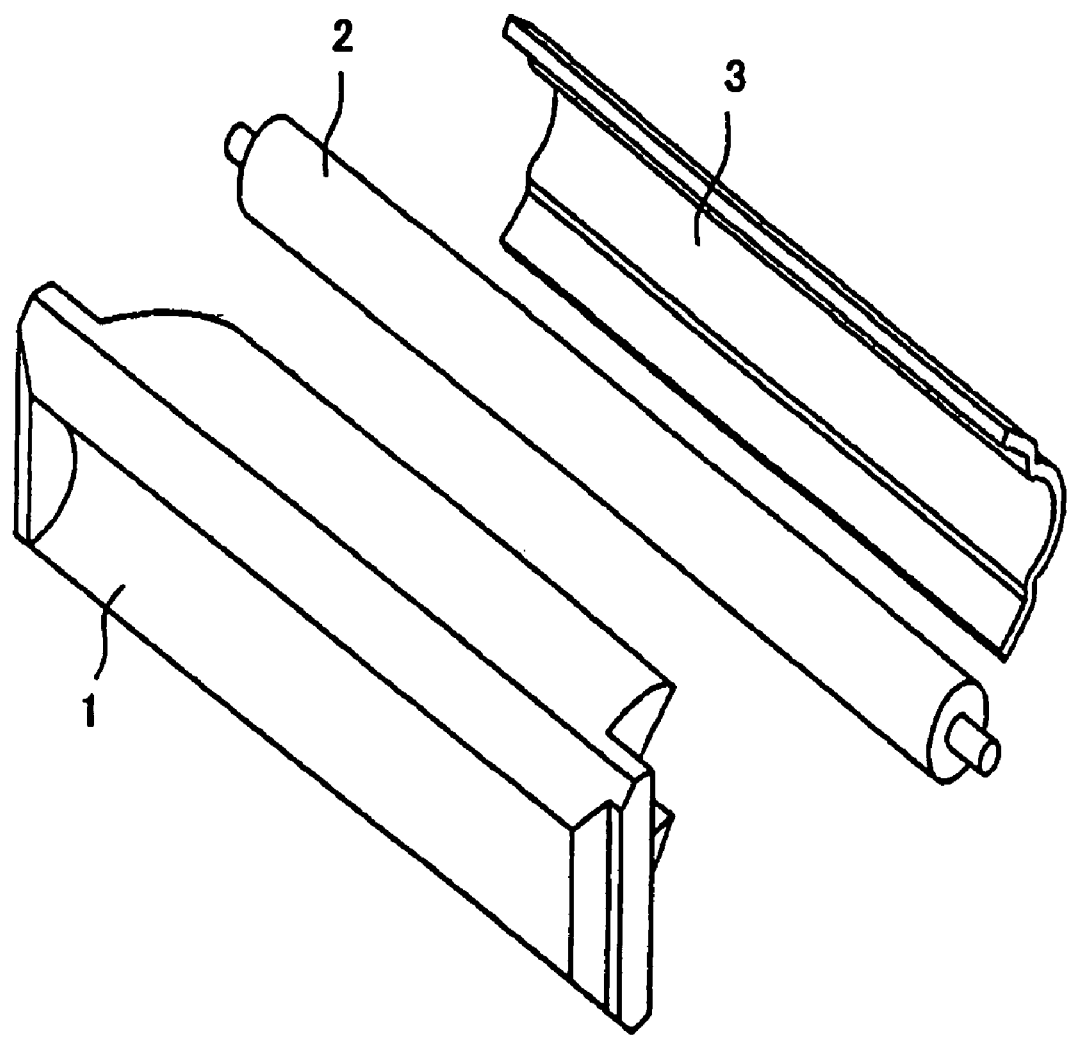
FIG. 5 is an exploded perspective view showing the structure of the essential components of the flashlight emitting apparatus according to Embodiment 1 of the present invention.

FIG. 5 is an exploded perspective view illustrating the internal structure of a flashlight emitting apparatus of a camera as shown in FIG. 6. It should be noted that this drawing shows only the essential components of the flashlight emitting apparatus, and holding members and lead wires are not depicted.

In FIG. 5, an optical prism 1, which is made of a glass material or optical resin material with high transmittivity such as acrylic resin, is arranged on the emission side (to the front of the apparatus) in the flashlight emitting apparatus. Numeral 2 denotes a straight tube-shaped flashlight discharge tube (xenon tube) that emits flashlight when a trigger signal is input into it. Numeral 3 denotes a reflection screen that reflects to the front of the apparatus those components of the light rays emitted from the flashlight discharge tube 2 that have been emitted to the rear of the apparatus. The inner side (reflection surface) of this reflection screen 3 is made of a metallic material having high reflectivity, such as brilliance aluminum or the like.

In the structure of above described camera, the following is a description of the camera operation for this structure, when the camera has been set to the "strobe auto-mode," for example.

When the user pushes the release button 21 half down, the brightness of the external light is measured by the light metering device, and the result of the light measurement is sent to a central processing unit arranged inside the camera body 26. Depending on the brightness of the external light and the sensitivity of the imaging medium (film or image pickup element, such as a CCD), the central processing unit judges whether the flashlight emitting apparatus should emit light or not.

If it is judged that the flashlight emitting apparatus should emit light, then, by giving out a light emission signal to the flashlight emitting apparatus when the release button 21 is pushed completely down, the central processing unit lets the flashlight discharge tube emit light via a trigger lead wire (not shown in the drawings) that is attached to the reflection screen 3. Here, those light rays emitted from the flashlight discharge tube 2 that are emitted in the direction opposite from the illumination direction (direction of an object side) are reflected by the reflection screen 3 arranged at the rear of the apparatus and are guided in the illumination direction. Moreover, the light rays that are emitted in the illumination direction are directly incident on the optical prism 1 arranged at the front of the apparatus, and after being converted to predetermined light distribution characteristics, they are irradiated onto the object.

With the flashlight emitting apparatus of the present embodiment, the size (in vertical direction of the camera) of the outgoing aperture portion of the flashlight emitting apparatus that can be seen in the external appearance of the camera can be made small, as explained below, and the light distribution characteristics can be optimized. Referring to FIGS. 1 to 3, the following is a more detailed description of a method for setting the optimum shape of the flashlight emitting apparatus (optical prism).

FIGS. 1 to 3 are vertical cross-sectional views of the flashlight emitting apparatus, taken along the radial direction of the flashlight discharge tube 2. In these drawings, numeral 1 denotes the optical prism for controlling the light distribution, numeral 2 denotes the straight tube-shaped flashlight discharge tube, numeral 3 denotes the reflection screen, which has a semi-circular tube portion 3a that is concentric to the flashlight discharge tube 2, and numeral 4 denotes a cover serving as an outer member of the camera body 26.

In addition to the cross section of FIG. 1, FIGS. 2 and 3 also show the tracing of representative light rays emitted from the inner center of the flashlight discharge tube 2. Here, FIG. 2 is a ray tracing diagram of those components of the light rays emitted from the flashlight discharge tube 2 that are close to the emission optical axis (referred to as "optical axis" in the following). FIG. 3 is a ray tracing diagram of those components of the light rays emitted from the flashlight discharge tube 2 that are emitted in a direction away from the optical axis (i.e. up or down in FIG. 3). It should be noted that apart from the light rays in FIGS. 2 and 3, the structure and shape of the entire illumination optical system are the same.

The flashlight emitting apparatus of this embodiment is characterized in that the size of the outgoing aperture portion of the flashlight emitting apparatus in the vertical direction of the apparatus (aperture height) can be minimized while maintaining the light distribution characteristics in the vertical direction of the apparatus uniform. In the following, the characteristic features of the shape of the flashlight emitting apparatus (optical prism 1) and the behavior of the light rays emitted from the flashlight discharge tube 2 are explained in detail.

First, the behavior of the light rays in an actual illumination optical system is described in detail using the ray tracing diagram shown in FIGS. 2 and 3. FIG. 2 shows the inner and outer diameter of a glass tube serving as the flashlight discharge tube 2. As for the light-emitting phenomenon of the flashlight discharge tube 2, it can be assumed that, in order to improve the light emission efficiency, light emission is mostly caused at the entire inner diameter of the flashlight discharge tube 2, and light emission is substantially uniform at the entire inner diameter of the flashlight discharge tube 2.

On the other hand, at the design stage, in order to efficiently control the light that is emitted from the flashlight discharge tube 2 serving as the light source, it is preferable to design the shape of the illumination optical system under the assumption that there is an ideal point light source at the light source center, rather than simultaneously taking into account all light rays of the entire inner diameter of the flashlight discharge tube 2. Then, efficient design is possible if, after the shape of the illumination optical system has been designed, a correction is performed in consideration of the fact that the light source has a finite size. Also this embodiment follows this approach, and the center of the light source is taken as the reference when determining the shape of the illumination optical system, and the shape of all the parts in the illumination optical system is set as described below.

The ray tracing diagram shown in FIG. 2 shows those components of the light rays emitted from the light source center that are emitted directly toward the ingoing surface 1a of the optical prism 1. These components form a relatively small angle with respect to the optical axis, and are subjected only to the refraction by the optical prism 1.

The ingoing surface (positive lens portion) 1a of the optical prism 1 is made of a cylindrical lens having positive refractive power, and has a very large refractive power. Therefore, the light rays that are emitted from the light source center and that pass through the ingoing surface 1a are condensed toward the optical axis, as shown in FIG. 2. After these light rays have been converted to a predetermined light distribution by refraction at the outgoing surface 1b of the optical prism 1, they are emitted toward the object.

The outgoing surface (negative lens portion) 1b of the optical prism 1 is made of a cylindrical lens having negative refractive power, and the light rays that are condensed toward the optical axis by the ingoing surface 1a are refracted by the outgoing surface 1b and directed in a direction away from the optical axis. Thus, the irradiation angle range of the light rays that have passed through the outgoing surface 1b is broadened.

In this manner, those light rays emitted from the light source center that are directly incident on the ingoing surface 1a are emitted near the optical axis at a narrow region (central region) of the outgoing surface 1b of the optical prism 1 that is narrower than the ingoing surface 1a, and converted into light rays having an angular range that is narrower than the angular range when emitted from the light source.

On the other hand, those light rays emitted from the light source center that travel towards the rear of the apparatus are reflected by the reflection screen 3 that is arranged at the rear of the apparatus. Here, the reflection screen 3 has a semi-circular tube portion 3a that is concentric to the light source center, so that the light rays that are reflected by the semi-circular tube portion 3a are guided back to the vicinity of the light source center. After that, they are emitted from the central region in the outgoing surface 1b of the optical prism 1, taking the same optical path as described above.

Here, the important point is that the region through which the light rays emitted from the light source center pass at the outgoing surface 1b is narrower than the region through which they pass at the ingoing surface 1a, and the angular region of the light rays emitted from the outgoing surface 1b is narrower than the angular region when they are incident on the ingoing surface 1a. That is to say, when the light source is considered to be a point light source, then, by forming an ingoing surface 1a having strong positive refractive power at the ingoing surface side of the optical prism 1 and forming an outgoing surface 1b having negative refractive power at the outgoing side, the light rays emitted from the light source center are first condensed by the ingoing surface 1a toward the optical axis and then emitted from a region of the outgoing surface 1b with a relatively smooth curvature near the optical axis. Thus, it is possible to emit efficiently condensed light rays from a narrow region of the outgoing surface 1b.

On the other hand, the ray tracing diagram shown in FIG. 3 shows those components of the light rays emitted from the light source center that are incident on the ingoing surfaces 1c and 1c' of the optical prism 1. That is to say, the light rays shown in FIG. 3 correspond to those components that form a larger angle with the optical axis than the light rays shown in FIG. 2, and are reflected at the optical prism 1.

Here, the ingoing surfaces 1c and 1c' of the optical prism 1 are made of surfaces forming a relatively large angle with the optical axis. Thus, the light rays incident on the ingoing surfaces 1c and 1c' are refracted by the ingoing surfaces 1c and 1c' and guided to the total reflection surfaces (reflective portions) 1d and 1d'. Then, the light rays reflected at the total reflection surfaces 1d and 1d' are condensed toward the optical axis.

As mentioned above, the ingoing surfaces 1c and 1c' are configured as surfaces forming a relatively large angle with the optical axis, because, if the inclination angle of the ingoing surfaces 1c and 1c' with respect to the optical axis were small, then some components of the light rays emitted from the light source center would undergo total reflection at the ingoing surfaces 1c and 1c', and the light rays emitted from the light source would be directed in a direction that is different from the intended direction of the ray tracing shown in FIG. 3. Thus, the present embodiment represses the occurrence of components that are totally reflected by the ingoing surfaces 1c and 1c', by providing the ingoing surfaces 1c and 1c' with a predetermined inclination.

The components reflected by the total reflection surfaces 1d and 1d' are guided to a region of the outgoing surface 1b that is narrower than the region of the ingoing surfaces 1c and 1c', as shown by the ray tracing diagram in FIG. 3. At the same time, the components that have been reflected by the total reflection surfaces 1d and 1d' are guided to peripheral regions at the upper and the lower edge of the outgoing surface 1b, and a large angular change is attained due to the refraction at this region when those components are emitted from the optical prism 1. And moreover, the angle of inclination of the light rays emitted from the outgoing surface 1b with respect to the optical axis becomes small. Moreover, the angular range of the light rays emitted from the optical prism 1 is considerably narrower than the angular range of light rays before incidence on the optical prism 1.

On the other hand, components of light rays emitted from the light source center and directed toward the rear of the apparatus that form relatively large angle with the optical axis are reflected by the reflection screen 3 arranged at the rear of the apparatus. Here, the reflection screen 3 has a semi-circular tube portion 3a that is concentric to the light source center, so that the light rays reflected by the semi-circular tube portion 3a of the reflection screen 3 are guided to near the light source center. After that, they are emitted from the peripheral regions of the outgoing surface 1b of the optical prism 1, taking the same optical path as described above.

Thus, as becomes clear from the ray tracing diagrams of the two components as shown in FIGS. 2 and 3, in both cases, the regions through which the light passes at the outgoing surface 1b is narrower than the region of the ingoing surfaces 1a and 1c (1c'), and the irradiation angle range is made extremely narrow by the irradiation into and emission out of the optical prism 1. Therefore, a superior condensing effect is attained, with a narrow outgoing aperture portion (outgoing surface 1b).

Moreover, light rays traveling through the refractive optical path as shown in FIG. 2 or the total reflection optical path as shown in FIG. 3 both pass through the outgoing surface 1b, and this outgoing surface 1b is made of a continuously curved surface, so that the influence of discrepancies due to machining precision of each part or positional shifts when assembling the illumination optical system can be reduced. That is to say, even when the position of the light rays that reach the outgoing surface 1b is slightly shifted, this hardly affects the optical characteristics, and consistent optical characteristics can be attained.

With the above-described structure of the illumination optical system, considerable changes in the optical characteristics also tend not to occur in the case that the size of the light source is assumed to have a certain constant size, and continuous changes in the optical characteristics are attained with respect to changes in the size of the light source, so that this structure is advantageous for providing illumination optical systems with a uniform light distribution.

Here, the outgoing surface 1b of the optical prism 1 is not made of a complicated surface, but of a single concave surface, so that there is the advantage that it can also be used directly as an external component of the flashlight emitting apparatus. Furthermore, in the flashlight emitting apparatus of the present embodiment, the light emitted from the light source can be condensed with very few structural components, so that there are the advantages that the condensing efficiency is high, and a uniform illumination without irregularities in the light distribution is attained with regard to the optical characteristics.

With the flashlight emitting apparatus of this embodiment, in the illumination optical system using the optical prism 1, it is possible to make only the size of the outgoing aperture portion (outgoing surface 1b) of the flashlight emitting apparatus smaller with respect to the vertical direction of the apparatus, while taking advantage of the characteristic features of small size and high condensing efficiency. That is to say, the size (apparatus height) that is necessary for the illumination optical system depends on the size given by the total reflection surfaces 1d and 1d', but the size of the outgoing aperture portion that is actually necessarily in order to irradiate illumination light onto the object can be made much smaller than the size constituted by the total reflection surfaces 1d and 1d'.

An ideal shape of the illumination optical system according to the present embodiment is described with reference to FIG. 1. FIG. 1 is a cross-sectional view of a flashlight emitting apparatus taken along the radial direction of the flashlight discharge tube 2. FIG. 1 shows the positional relation between a cover 4 serving as an outer member of the camera body 26 and the illumination optical system. As explained above, it is the outgoing surface 1b of the optical prism 1 that functions as the outgoing aperture portion of the illumination optical system, so that the cover 4 is formed such that only the outgoing surface 1b is exposed to the outside of the camera. Thus, the size, with respect to the vertical direction of the apparatus, of the aperture portion formed in the cover 4 can be made small, and the characteristic features of the illumination optical system of the present embodiment can be utilized best.

Moreover, the tip portions 1h of the optical prism 1 that are formed on the light source side are configured such that they extend to a position corresponding to the light source center, as shown in FIG. 1. The reason for this is that if the tip portions 1h of the optical prism 1 were positioned further to the front of the apparatus than a position corresponding to the light source center, then those components of the light rays emitted from the light source that are emitted at an angle of substantially 90° to the optical axis (i.e. upward or downward in FIG. 1) cannot be picked up, and the light rays emitted from the light source cannot be condensed efficiently.

If, on the other hand, the tip portions 1h of the optical prism 1 were formed such that they extend to the rear of the apparatus behind the position corresponding to the light source center so as to try to gather efficiently all of the light emitted from the light source, then the optical prism 1 would become large. And moreover, it would become difficult to totally reflect the light rays emitted from the light source at the reflection surfaces 1d and 1d', and the components leaking from the optical prism 1 would increase, so that the light rays emitted from the light source cannot be utilized efficiently.

For this reason, with regard to the condensing efficiency and size of the illumination optical system, it is preferable that the tip portions 1h of the optical prism 1 are formed to a position that substantially matches the position of the light source center, as shown in FIG. 1.

As mentioned above, the reflection screen 3 has a semi-circular tube portion 3a that is concentric to the light source center, and at both ends of the semi-circular tube portion 3a, there are lateral portions 3b that are formed in one piece with the semi-circular portion 3a, and that are bent to the rear side of the apparatus with respect to the tip portions 1h of the optical prism 1.

As shown in the ray tracing diagrams in FIGS. 2 and 3, the light rays emitted from the light source center do not leak from the total reflection surfaces 1d and 1d' of the optical prism 1, but within the light rays emitted from a position that is slightly off the center of the light source, there are light rays that leak from the total reflection surfaces 1d and 1d'. For this reason, by providing the reflection screen 3 with the lateral portions 3b, the light rays leaked from the total reflection surfaces 1d and 1d' reflect at the lateral portions 3b, and are incident again on the total reflection surfaces 1d and 1d' of the optical prism 1.

As shown in FIG. 1, the lateral portions 3b of the reflection screen 3 are formed along the total reflection surfaces 1d and 1d' of the optical prism 1, so that also the light that is reflected at the lateral portions 3b and incident again at the total reflection surfaces 1d and 1d' can be effectively utilized as object illumination light.

The following is an explanation of the ideal shape of the optical prism 1. First, the dimensions of the optical prism 1 in the vertical direction of the apparatus are explained.

In FIG. 1, it is preferable that the aperture height D of the outgoing surface 1b in the vertical direction of the apparatus is within the range of the Expression (1). That is, the ratio between the aperture height D of the outgoing surface 1b of the optical prism 1 and the maximum height A constituted by the total reflection surfaces 1d and 1d' of the optical prism is given by:

$$0.4 \leq D/A \leq 0.8 \quad (1)$$

In order to adapt to new camera designs, it would be ideal to suppress the aperture height D as much as possible, but depending on the size of the flashlight discharge tube 2 serving as the light source, the light loss becomes larger as the length of the aperture height D is shortened, and it may not be possible to configure an effective condensing optical system.

That is to say, if the aperture height D of the outgoing surface 1b is shortened, and the size of the light source is increased, the light that travels directly to the outgoing surface 1b of the optical prism 1 is reduced, and the components that repeatedly undergo total reflection inside the optical prism 1 are increased. As a result, most of the components that would have been emitted from the outgoing surface 1b are emitted from other portions of the optical prism 1, and those components of the light rays emitted from the light source that can be used effectively for the illumination of the object are decreased. Consequently, with the above structure, even though the aperture height D of the outgoing surface 1b is reduced, it is still not necessarily an ideal illumination optical system with regard to the effective utilization of light rays emitted from the light source.

With regard to this, the lower limit of Expression (1) is the aperture height D of the outgoing surface 1b that functions effectively as the illumination optical system if the size (diameter) of the flashlight discharge tube 2 serving as the light source is relatively small. And the upper limit of Expression (1) becomes the aperture height D that functions effectively for the illumination optical system if the size (diameter) of the flashlight discharge tube 2 is large.

Thus, if the diameter of the flashlight discharge tube 2 is small, the lower limit of Expression (1) is the size of the aperture height D that functions effectively for the illumination optical system, and it follows from the expression that the aperture height D can be made smaller if the flashlight discharge tube 2 is made smaller. However, due to such reasons as the durability and the manufacturing process of the actual flashlight discharge tube 2, there are no flashlight discharge tubes 2 below a certain diameter.

Considering the diameter of flashlight discharge tubes 2 that can be manufactured in practice, then a lower limit for D/A of 0.4 seems appropriate.

On the other hand, if the upper limit 0.8 for D/A in Expression (1) is exceeded, then the aperture height D becomes large, which is not desirable with regard to the object of the present invention, namely to reduce the size of the outgoing aperture portion in the vertical direction of the apparatus.

The following is a discussion of actual numbers for Expression (1) in a flashlight emitting apparatus according to the present embodiment. In the present embodiment, the diameter (inner diameter) of the flashlight discharge tube 2 is φ1.3 mm, the maximum height A of the total reflection surfaces 1d and 1d' of the optical prism 1 is 5 mm, and the aperture height D of the outgoing surface 1b of the optical prism 1 is 3 mm. From these numbers, it follows that the value of D/A in Expression (1) is 0.6, which is approximately the median of Expression (1).

It is preferable that the shape of the optical prism 1 of the present embodiment in the optical axis direction is as follows: When L is the distance from the tips of the outgoing surface 1b to the maximally outer contour (maximum aperture position) of the total reflection surfaces 1d and 1d', and B is the distance from the maximally outer contour of the total reflection surfaces 1d and 1d' to the light source center, then the ratio L/B is in the following range:

$$0.1 \leq L/B \leq 0.5 \quad (2)$$

In Expression (2), considering miniaturization of the flashlight emitting apparatus in the optical axis direction, it is preferable that the distance L is as short as possible. However, in order to form the outgoing surface 1b, a certain length is necessary for manufacturing reasons for example. Moreover, a certain length L is necessary in order to configure the cover 4 serving as the outer member of the camera body 26 such that it follows the outer lateral surfaces 1i of the outgoing surface 1b, to make the outgoing surface 1b of the optical prism 1 appear smaller.

In the present embodiment, considering these two aspects, the relation of the distance L and the distance B is set such that the Expression (2) is satisfied.

The lower limit 0.1 in Expression (2) is set based on the distance L and the distance B that are necessary to form the optical prism 1 in view of those two aspects. If the lower limit is undercut, then it is not possible to configure an illumination optical system that is effective with regard to condensing efficiency and the like.

On the other hand, the upper limit of 0.5 in Expression (2) is set based on the following viewpoint: If L/B is greater than 0.5, then the length of the optical prism 1 in the optical axis direction is increased (i.e. becomes larger), and the original goal, namely to make the flashlight emitting apparatus smaller, which is one effect of this embodiment, is missed.

The following is a discussion of actual numbers for Expression (2) in a flashlight emitting apparatus according to the present embodiment. In the present embodiment, the distance L is 1.1 mm and the distance B is 3.9 mm. From these numbers, it follows that L/B is 0.28, which is approximately the median of Expression (2).

Thus, by restricting the shape of the optical prism 1 to the ranges given in the Expressions (1) and (2), the optical prism 1 can be kept from becoming larger, and the aperture height D of the outgoing surface 1b can be reduced.

Referring to FIG. 4, the following is an explanation of the structure of the flashlight emitting apparatus with regard to the axial direction of the flashlight discharge tube 2. FIG. 4 is a cross-sectional view of a flashlight emitting apparatus taken along the axial direction (longitudinal direction) of the flashlight discharge tube 2, and the same numerals are given to members corresponding to those explained for FIGS. 1 to 3.

A characteristic feature of the optical prism 1 is that the lateral sides positioned at its two ends are provided with total reflection surfaces 1e and 1e'. Thus, the light rays that deviate from the range that is necessary for irradiating illumination light onto the object (necessary irradiation angle range) undergo total reflection at the total reflection surfaces 1e and 1e', and can be guided to within the necessary irradiation angle range, and the light rays emitted from the light source can be effectively utilized.

Another characteristic feature of the shape of the outgoing surface 1b of the optical prism 1 is that the end faces located at both ends in longitudinal direction of the outgoing surface 1b are slanted surfaces 1f and 1f'. Thus, it can be repressed that light rays that are emitted from the light source and that are directed within the necessary irradiation angle range escape at the two ends of the outgoing surface 1b, and the distractive sensation at the seam to the cover 4 serving as the outer member of the camera body 26 can be eliminated.

On the other hand, by forming a cylindrical lens with negative refractive power over the entire central region of the outgoing surface 1b, a structure is attained in which the condensing effect in the vertical direction of the apparatus is not adversely affected. Moreover, by making the central region of the outgoing surface 1b of a cylindrical lens with a single convex surface, there is the advantage that the camera can be provided with a clear-cut appearance without distracting features.

In this embodiment, an example of an illumination optical system was shown with a structure in which the light rays emitted from the light source center are broadened through an optical prism 1 to a necessary irradiation angle range. However, the present invention is not limited to the form of the optical prism 1 in the above-described Embodiment 1.

For example, it is also possible to configure the convex cylindrical lens forming the ingoing surface of the optical prism with a Fresnel lens having positive refractive power, and to configure the concave cylindrical lens forming the outgoing surface with a Fresnel lens having negative refractive power. Moreover, in the present embodiment, the reflective surfaces 1d and 1d' of the optical prism 1 are formed as total reflection surfaces, and they may be made of metal deposition surfaces, in which case the limit of the angle of light rays incident on the reflective surfaces becomes small, so that the optical prism can be made smaller and the light rays emitted from the light source can be condensed more efficiently.

Moreover, in the present embodiment, the reflective screen 3 is made of a semi-circular tube portion 3a that is concentric to the center of the flashlight emitting tube 2, but there is no limitation to this shape, and it is also possible to form the reflective screen such that it has a curved surface of the second order.

Embodiment 2

FIGS. 7 to 12 illustrate a flashlight emitting apparatus (illumination apparatus) according to Embodiment 2 of the present invention. It should be noted that the flashlight emitting apparatus of this embodiment is of the type with fixed illumination angle.

Figure 7:
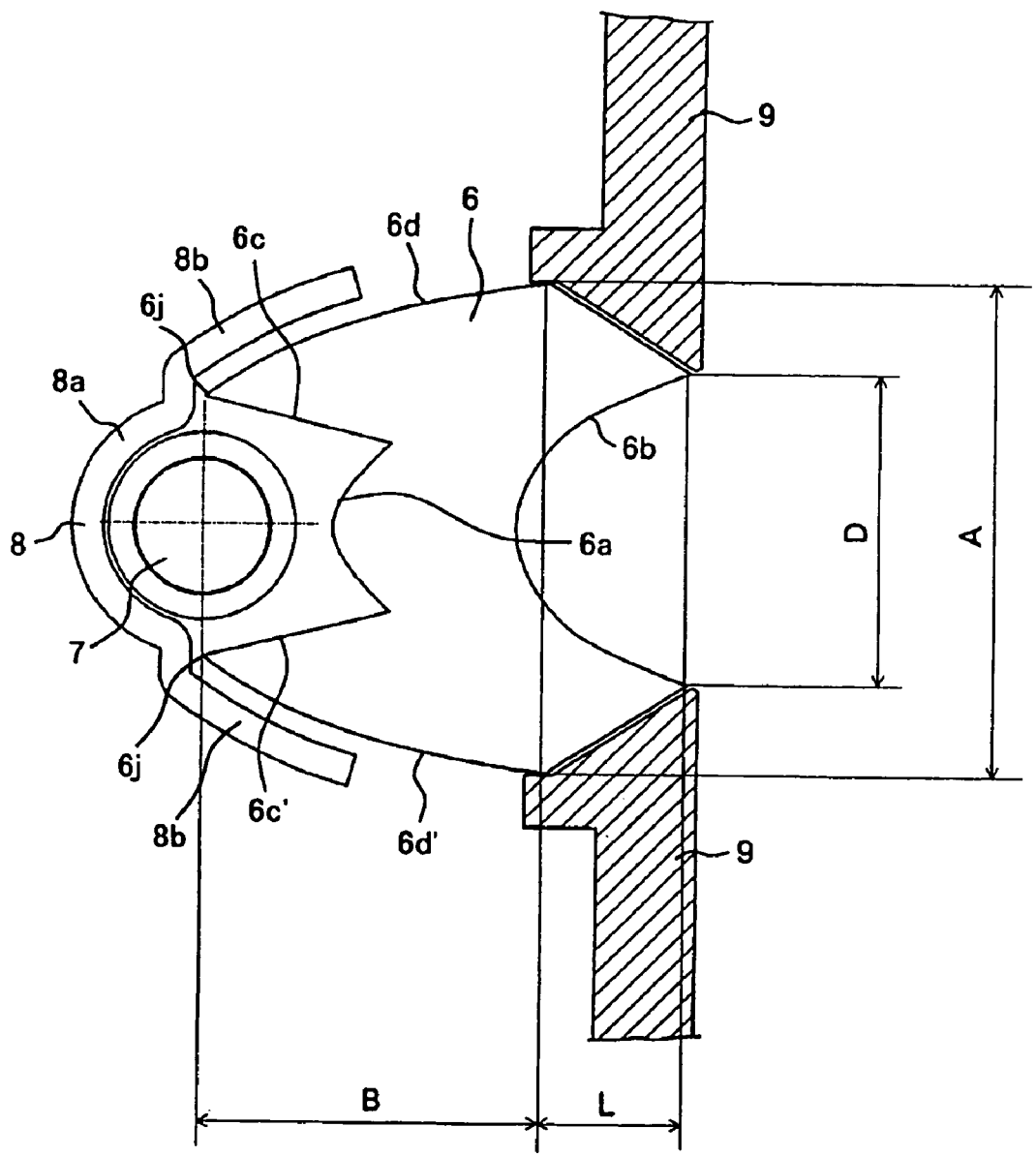
FIG. 7 is a cross-sectional view of a flashlight emitting apparatus according to Embodiment 2 of the present invention, taken along the radial direction of the flashlight discharge tube.
Figure 8:
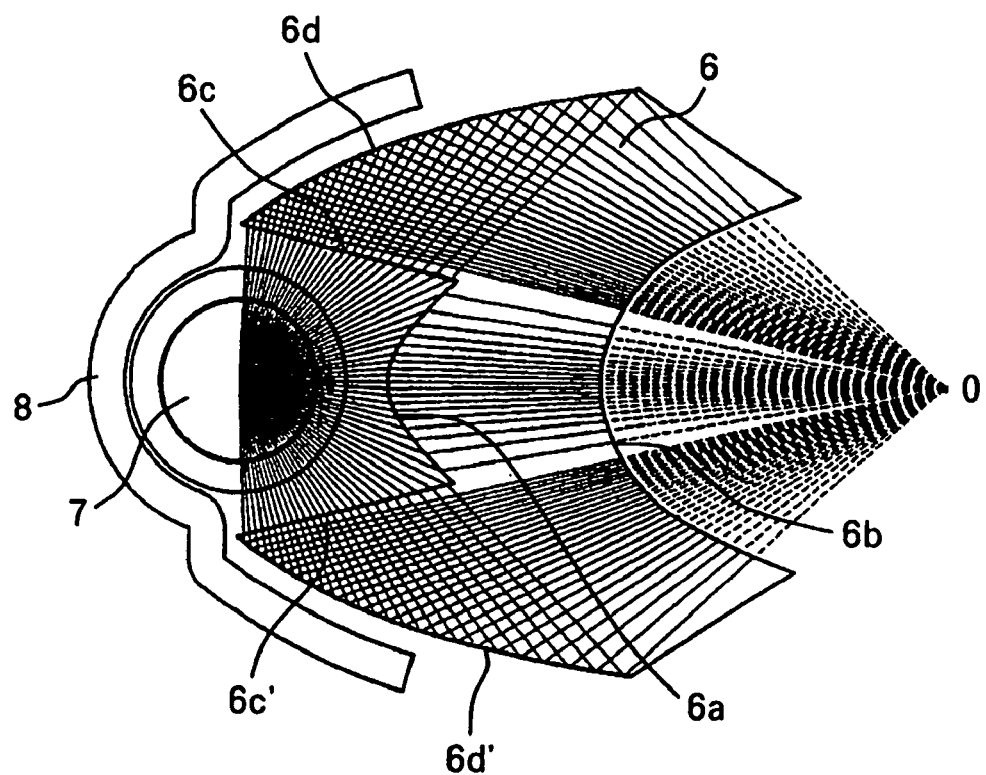
FIG. 8 is a diagram illustrating the concept behind the shape of the condensing optical system in Embodiment 2 of the present invention.
Figure 9:
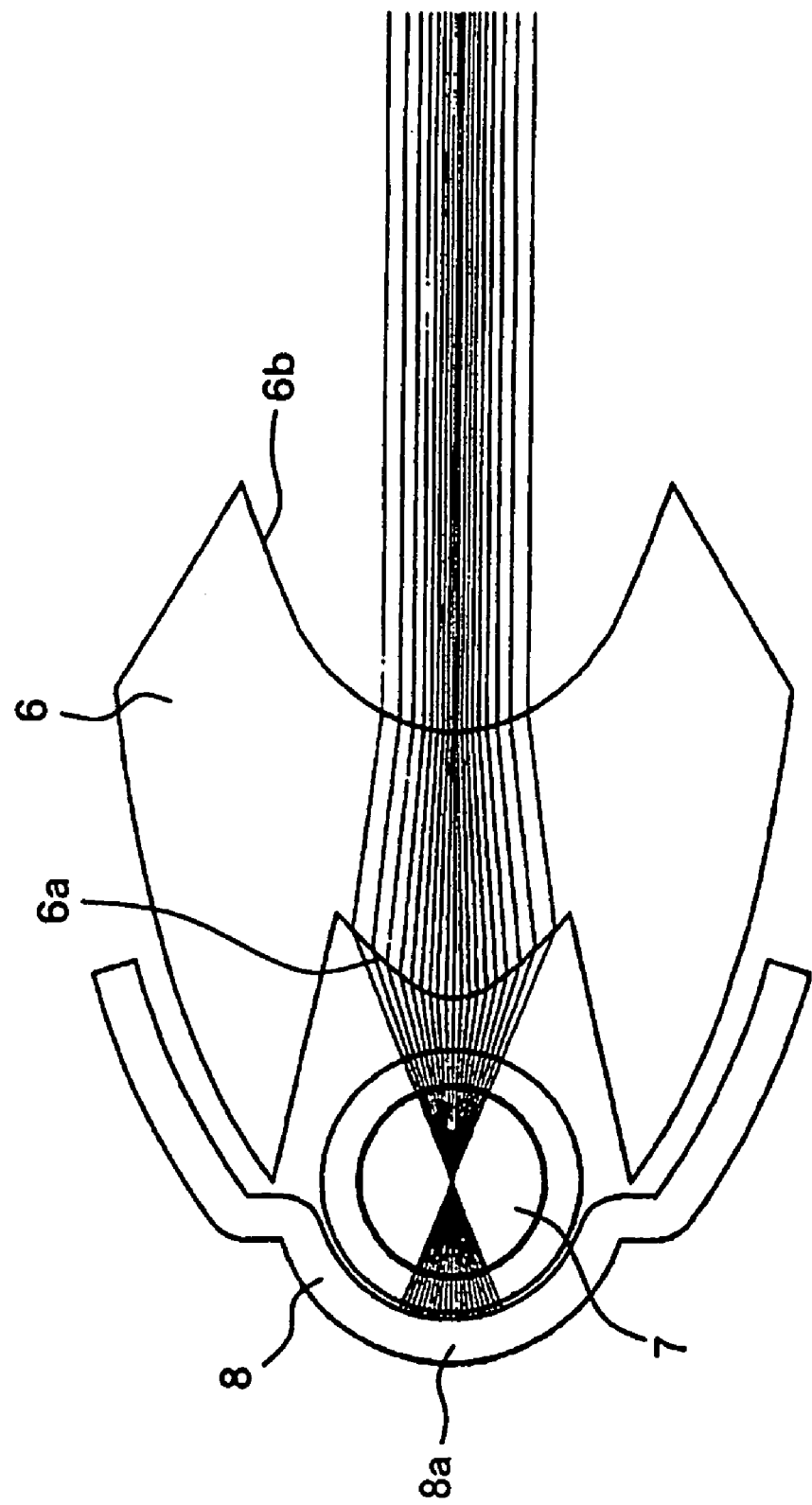
FIG. 9 is a diagram showing the distribution of light rays from the light source in Embodiment 2 of the present invention.
Figure 10:
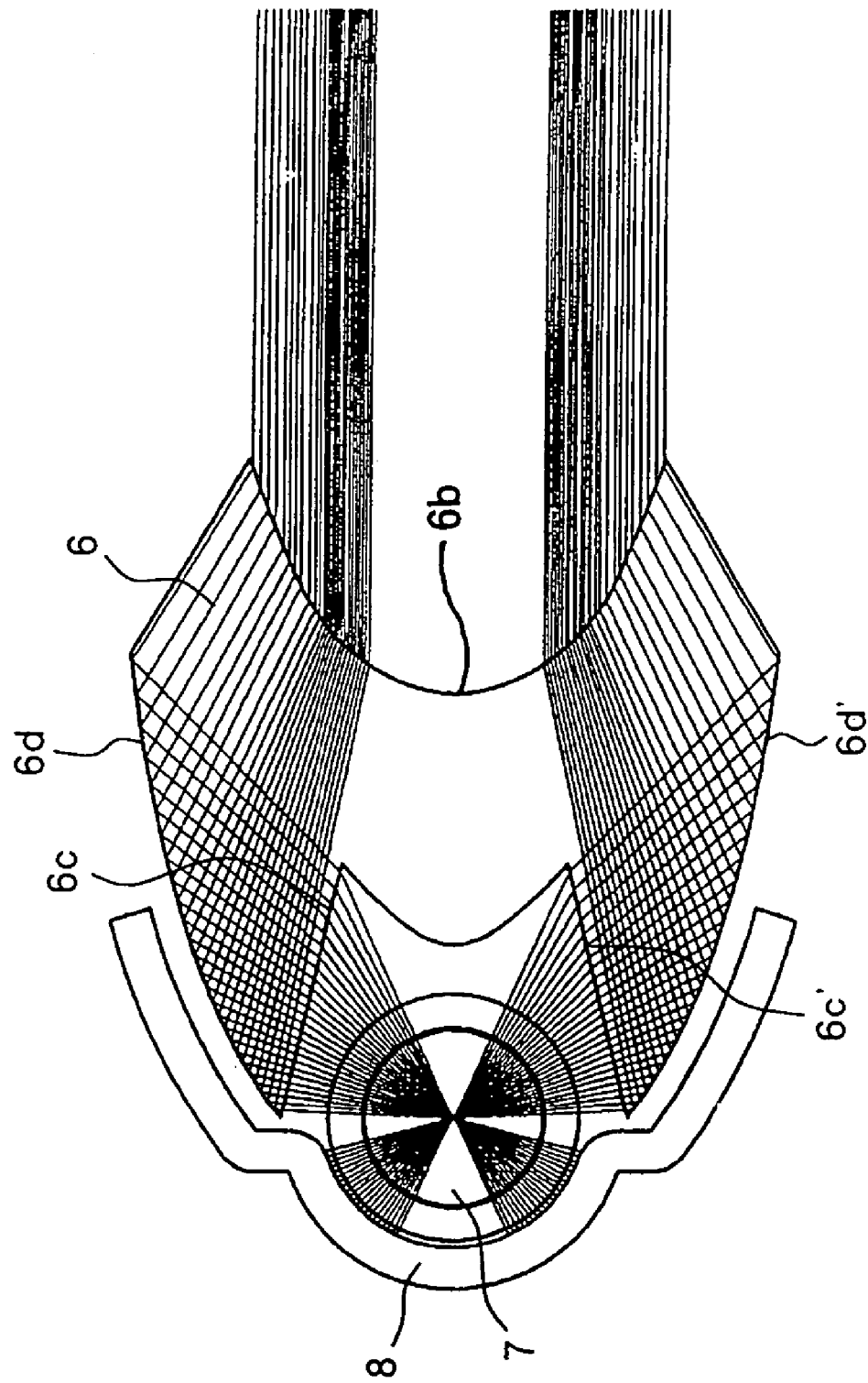
FIG. 10 is a diagram showing the distribution of light rays from the light source in Embodiment 2 of the present invention.
Figure 11:
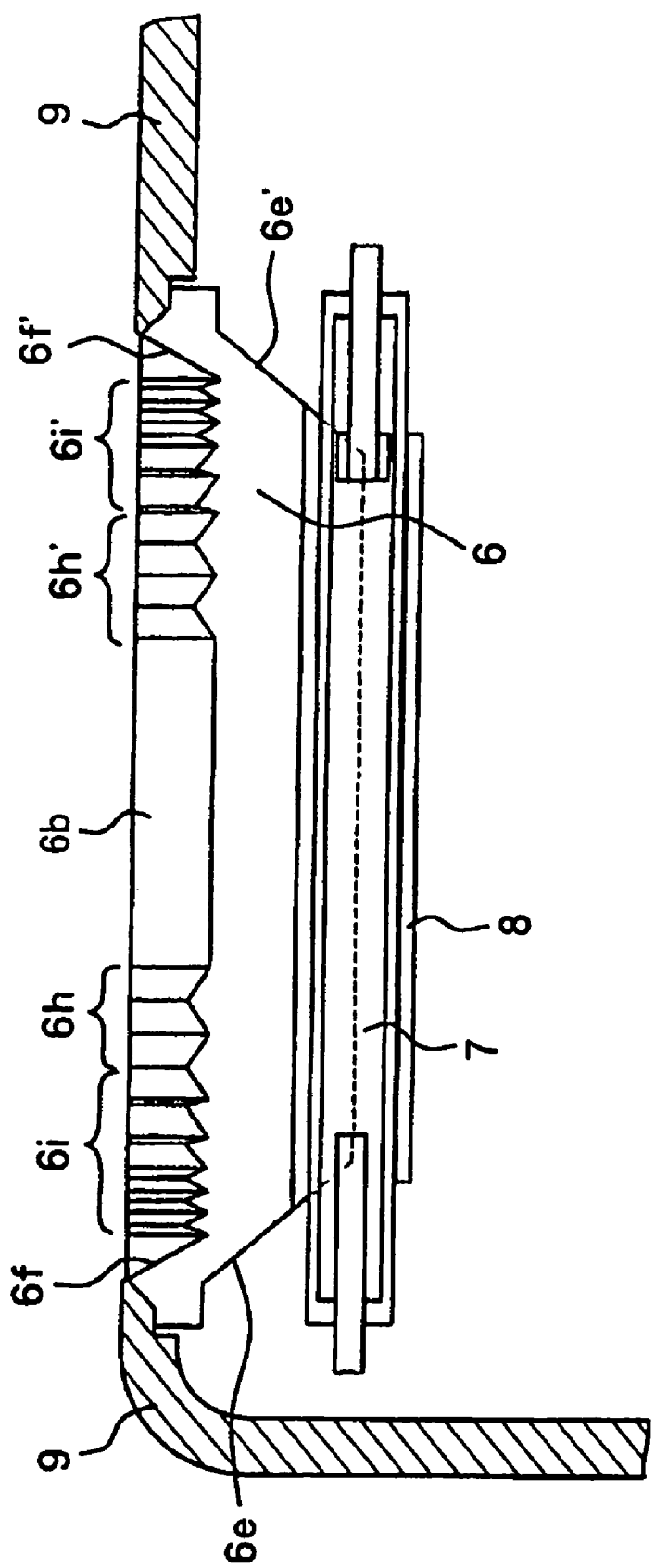
FIG. 11 is a cross-sectional view of a flashlight emitting apparatus according to Embodiment 2 of the present invention, taken along the longitudinal direction of the flashlight discharge tube.

FIG. 7 is a cross-sectional view of the flashlight emitting apparatus, along the radial direction of the flashlight discharge tube, and FIG. 8 illustrates the concept behind the shape of the optical prism. FIGS. 9 and 10 are diagrams in which ray tracing of the light emitted from the light source center has been added to the cross-sectional view of FIG. 7. FIG. 11 is a cross-sectional view of a flashlight emitting apparatus along the axial direction (longitudinal direction) of the flashlight discharge tube, and FIG. 12 is an exploded perspective view showing the structure of the essential components of the flashlight emitting apparatus.

Figure 12:
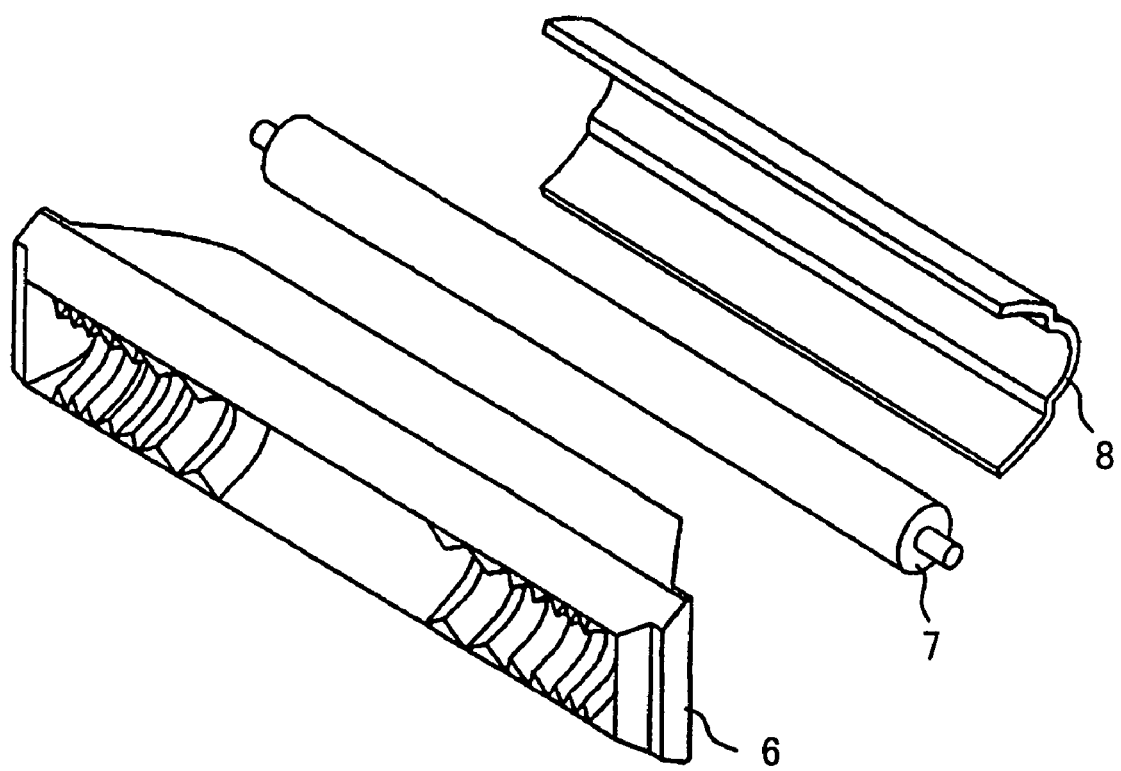
FIG. 12 is an exploded perspective view showing the structure of the essential components of the flashlight emitting apparatus according to Embodiment 2 of the present invention.

FIG. 12, which is an exploded perspective view illustrating the internal structure of the flashlight emitting apparatus, shows the essential portions of the flashlight emitting apparatus, but does not show holding members or lead wires.

In FIG. 12, numeral 6 denotes an optical prism that is made of a glass material or optical resin material with high transmittivity such as acrylic resin, and that is arranged on the emission side (to the front of the apparatus) in the flashlight emitting apparatus. Numeral 7 denotes a tube-shaped flashlight discharge tube (xenon tube) that emits flashlight when a trigger signal is input into it. Numeral 8 denotes a reflection screen that reflects to the emission side (to the front of the apparatus) those components of the light rays emitted from the flashlight discharge tube 7 that have been emitted to the rear of the apparatus. The inner side (reflection surface) of this reflection screen 8 is made of a metallic material having high reflectivity, such as brilliance aluminum or the like. It should be noted that the flashlight emitting apparatus of this embodiment is provided in a camera as described in Embodiment 1 (FIG. 6).

The main aspects of the flashlight emitting apparatus of this embodiment are that the size of the outgoing aperture portion of the flashlight emitting apparatus that can be seen from outside the camera (i.e. the size in the vertical direction of the camera) is decreased, and the light rays emitted from the flashlight discharge tube are optimally condensed. Referring to FIGS. 7 to 11, the following is a detailed description of a method for setting the most suitable shape of the flashlight emitting apparatus (optical prism).

FIGS. 7 to 10 are longitudinal cross-sectional views of the flashlight emitting apparatus along a radial direction of the flashlight discharge tube. In these drawings, numeral 6 denotes an optical prism for controlling light distribution, numeral 7 denotes a tube-shaped flashlight discharge tube, numeral 8 denotes a reflection screen having a semi-circular tube portion 8a that is concentric to the flashlight discharge tube 7, and numeral 9 denotes a cover serving as an outer member of the camera body.

In addition to the cross section view of FIG. 7, FIGS. 8 to 10 also show the tracing of representative light rays emitted from a radially central portion (light source center) of the flashlight discharge tube 7. Here, FIG. 9 is a ray tracing diagram of those components of the light rays emitted from the flashlight discharge tube 7 that are close to the emission optical axis (referred to as "optical axis" in the following). FIG. 10 is a ray tracing diagram of those components of the light rays emitted from the flashlight discharge tube 7 that are emitted in a direction away from the optical axis (i.e. up or down in FIG. 10). It should be noted that apart from the light rays in FIGS. 8 to 10, the structure and shape of the entire illumination optical system is the same.

The flashlight emitting apparatus of this embodiment is characterized in that the shape of the illumination optical system is determined such that the light emitted from the flashlight emitting apparatus is condensed optimally while minimizing the size of the outgoing aperture portion of the flashlight emitting apparatus in the vertical direction of apparatus (aperture height). In the following, the characteristic features of the shape of the optical prism 6 and the behavior of the light rays emitted from the flashlight discharge tube 7 are explained in detail.

First, the approach that was taken to determine the shape of the illumination optical system in this embodiment is explained in detail with reference to the ray tracing diagrams (FIGS. 8 to 10) of the actual illumination optical system.

FIG. 8 is a drawing showing the behavior of the light rays emitted from the light source center after they have been incident the optical prism 6. A characteristic feature of this embodiment is that the illumination optical system is configured such that a plurality of light rays emitted from the light source center reach predetermined positions that are continuously arranged on the outgoing surface 6b of the optical prism 6, without crossing or interfering with one another. That is to say, the shape of the optical prism 6 is determined such that each of a plurality of angles at which the light rays that are emitted from the light source center corresponds to a specific location on the outgoing surface 6b.

Moreover, assuming that the optical prism 6 is sufficiently long in the optical axis direction, the shape of the various parts of the optical prism 6 is determined such that the light rays emitted from the light source are condensed on substantially one point (focus point) O, as shown by the broken lines in FIG. 8.

By determining the shape of the various portions of the optical prism 6 (ingoing surfaces 6a, 6c and 6c', total reflection surfaces 6d and 6d', and outgoing surface 6b) in this manner, the aperture height of the outgoing surface (outgoing surface 6b) of the illumination optical system can be reduced to a minimum. Moreover, by configuring the outgoing surface 6b of the optical prism 6 with a lens having a suitable negative refractive power, it becomes possible to appropriately adjust the irradiation angle range. Thus, an efficient condensing optical system that has a small outgoing aperture portion, in accordance with the object of the present invention, can be configured.

Regarding the shape of the outgoing surface 6b of the optical prism 6, the present embodiment strives for an illumination optical system with the best condensing properties, and the shape of the outgoing surface 6b is determined as described below with reference to FIGS. 9 and 10.

The ray tracing diagram shown in FIG. 9 shows those components of the light rays emitted from the light source center that are directly incident on the ingoing surface 6a of the optical prism 6. These light components form an angle with the optical axis that is relatively small, and are only subjected to the refraction by the optical prism 6.

The ingoing surface (positive lens portion) 6a of the optical prism 6 is made of a cylindrical lens having positive refractive power, and has a very strong refractive power, so that the light rays that are emitted from the light source center and pass through the ingoing surface 6a' are condensed toward the optical axis, as shown in FIG. 9. After these light rays have been refracted at the outgoing surface 6b of the optical prism 6 and converted into light rays that are parallel to the optical axis, they are emitted in the direction toward the object.

Here, the outgoing surface (negative lens portion) 6b of the optical prism 6 is made of a cylindrical lens having negative refractive power, and the light rays that have been condensed toward the optical axis by the ingoing surface 6a are turned into light rays that are parallel to the optical axis, due to the refraction of the outgoing surface 6b.

Those of the light rays emitted from the light source center that are incident on the ingoing surface 6a are emitted from a region (central region) of the outgoing surface 6b of the optical prism 6 near the optical axis that is narrower than the ingoing surface 6a, and are converted into light rays that have an angular distribution that is much narrower than the irradiation angles when emitted from the light source.

On the other hand, those of the light rays emitted from the light source center that are directed toward the rear of the apparatus are reflected by the reflection screen 8 arranged at the rear of the apparatus. Here, the reflection screen 8 has a semi-circular tube portion 8a that is concentric to the light source center, so that the light rays that are reflected by the semi-circular tube portion 8a of the reflection screen 8 are guided back to the vicinity of the light source center. After that, they are emitted from the central region in the outgoing surface 6b of the optical prism 6, taking the same optical path as described above.

Here, the important point is that the region through which the light rays emitted from the light source center pass at the outgoing surface 6b is narrower than the region through which they pass at the ingoing surface 6a, and the angular region of the light rays emitted from the outgoing surface 6b is narrower than the angular region when they are incident on the ingoing surface 6a. That is to say, when the light source is considered to be a point light source, then, by forming an ingoing surface 6a having strong positive refractive power at the ingoing side of the optical prism 6 and forming an outgoing surface 6b having negative refractive power at the outgoing side, the light rays emitted from the light source center are first condensed by the ingoing surface 1a toward the optical axis and then emitted from a region of the outgoing surface 6b with a relatively smooth curvature near the optical axis. Thus, it is possible to emit efficiently condensed light rays from a narrow region of the outgoing surface 6b.

On the other hand, the ray tracing diagram shown in FIG. 10 shows those components of the light rays emitted from the light source center that are incident on the ingoing surfaces 6c and 6c' of the optical prism 6. That is to say, the light rays shown in FIG. 10 correspond to those components that form a larger angle with the optical axis than the light rays shown in FIG. 9, and are reflected at the optical prism 6.

Here, the ingoing surfaces 6c and 6c' of the optical prism 6 are made of surfaces forming a relatively large angle with the optical axis. Thus, as in Embodiment 1, the light rays incident on the ingoing surfaces 6c and 6c' are refracted by the ingoing surfaces 6c and 6c' and guided to the total reflection surfaces (reflective portions) 6d and 6d. Then, the light rays reflected at the total reflection surfaces 6d and 6d' are condensed toward the optical axis.

The ingoing surfaces 6c and 6c' are made of surfaces forming a relatively large angle with the optical axis, because, if the inclination angle of the ingoing surfaces 1c and 1c'0 with respect to the optical axis were small, then some components of the light rays emitted from the light source center would undergo total reflection at the ingoing surfaces 6c and 6c', and the light rays emitted from the light source would be directed in a direction that is different from the intended direction of the ray tracing shown in FIG. 10. Thus, as in Embodiment 1, the present embodiment represses the occurrence of components that are totally reflected by the ingoing surfaces 6c and 6c', by providing the ingoing surfaces 6c and 6c' with a predetermined inclination.

The components reflected by the total reflection surfaces 6d and 6d' are guided to a region of the outgoing surface 6b that is narrower than the regions of the ingoing surfaces 6c and 6c', as shown by the ray tracing diagram in FIG. 10. At the same time, the components that have been reflected by the total reflection surfaces 6d and 6d' are guided, continuously and without crossing, to peripheral regions at the upper and the lower edge of the outgoing surface 6b, and are converted into light rays that are parallel to the optical axis, due to the refraction at those regions. Thus, the angular range of the light rays emitted from the optical prism 6 (outgoing surface 6b) is considerably narrower than the angular range of light rays before incidence on the optical prism 6 (ingoing surfaces 6c and 6c').

On the other hand, components of light rays emitted from the light source center and directed toward the rear of the apparatus that form relatively large angle with the optical axis are reflected by the reflection screen 8 arranged at the rear of the apparatus. Here, the reflection screen 8 has a semi-circular tube portion 8*a* that is concentric to the light source center, so that the light rays reflected by the semi-circular tube portion 8*a* of the reflection screen 8 are guided to near the light source center. After that, they are emitted from the peripheral regions in the outgoing surface 6*b* of the optical prism 6, taking the same optical path as described above.

Thus, as becomes clear from the ray tracing diagrams of the two components as shown in FIGS. 9 and 10, in both cases, the regions through which the light passes at the outgoing surface 6*b* is narrower than the regions of the ingoing surfaces 6*a* and 6*c* (6*c'*). Moreover, the light rays emitted from the light source center are all converted into light rays that are parallel to the optical axis. Therefore, a favorable condensing effect is attained, with a narrow outgoing aperture portion (outgoing surface 6*b*).

Moreover, light rays traveling through the refractive optical path as shown in FIG. 9 and the total reflection optical path as shown in FIG. 10 both pass through the outgoing surface 6*b*, and this outgoing surface 6*b* is made of a continuously curved surface, so that the influence of discrepancies due to machining precision of each part or positional shifts when assembling the illumination optical system can be reduced. That is to say, even when the position of the light rays that reach the outgoing surface 6*b* is slightly shifted, this hardly affects the optical characteristics, and consistent optical characteristics can be attained.

With the above-described structure of the illumination optical system, considerable changes in the optical characteristics also tend not to occur in the case that the size of the light source has a certain constant size, and continuous changes in the optical characteristics are attained with respect to changes in the size of the light source, so that this structure is advantageous for providing illumination optical systems with a uniform light distribution.

Here, even though its central region is sunk down deeper than that of the outgoing surface 1*b* of the optical prism 1 in Embodiment 1, the outgoing surface 6*b* of the optical prism 6 is not made of a complicated surface, but of a single concave surface, so that there is the advantage that it can also be used directly as an external component of the flashlight emitting apparatus. Furthermore, in the flashlight emitting apparatus of the present embodiment, the light emitted from the light source can be condensed with very few structural components, so that the condensing efficiency is high, and a uniform illumination without irregularities in the light distribution is attained with regard to the optical characteristics.

With the flashlight emitting apparatus of this embodiment, in the illumination optical system using the optical prism 6, it is possible to make only the size of the outgoing aperture portion (outgoing surface 6*b*) of the flashlight emitting apparatus smaller in the vertical direction of the apparatus, while taking advantage of the characteristic features of small size and high condensing efficiency. That is to say, the size (apparatus height) that is necessary for the illumination optical system depends on the size given by the total reflection surfaces 6*d* and 6*d'*, but the size of the outgoing aperture portion that is actually necessarily in order to irradiate illumination light onto the object can be made much smaller than the size constituted by the total reflection surfaces 6*d* and 6*d'*.

An ideal shape of the illumination optical system according to the present embodiment is described with reference to FIG. 7. FIG. 7 is a cross-sectional view of a flashlight emitting apparatus taken along the radial direction of the flashlight discharge tube 7. FIG. 7 shows the positional relation between a cover 9 serving as an outer member of the camera body 26 and the illumination optical system. As explained above, it is the outgoing surface 6*b* of the optical prism 6 that functions as the outgoing aperture portion of the illumination optical system, so that the cover 9 is formed such that only the outgoing surface 6*b* is exposed to the outside of the camera. Thus, the size (with respect to the vertical direction of the apparatus) of the aperture portion formed by the cover 9 can be made small, and the characteristic features of the illumination optical system of the present embodiment can be utilized best.

Moreover, the tip portions 6*j* of the optical prism 6 that are formed on the light source side are configured such that they extend to a position corresponding to the light source center, as shown in FIG. 7. The reason for this is that if the tip portions 6*j* of the optical prism 6 are positioned further to the front of the apparatus than a position corresponding to the light source center, then those components of the light rays emitted from the light source that are emitted at an angle of substantially 90° to the optical axis (i.e. upward or downward in FIG. 7) cannot be picked up, and the light rays emitted from the light source cannot be condensed efficiently.

If, on the other hand, the tip portions 6*j* of the optical prism 6 are formed such that they extend to the rear of the apparatus behind the position corresponding to the light source center so as to try to gather efficiently all of the light emitted from the light source, then the optical prism 6 becomes large. And moreover, it becomes difficult to totally reflect the light rays emitted from the light source at the reflection surfaces 6*d* and 6*d'*, and the components leaking from the optical prism 6 increase, so that the light rays emitted from the light source cannot be utilized efficiently.

For this reason, with regard to the condensing efficiency and size of the illumination optical system, it is preferable that the tip portions 6*j* of the optical prism 6 are formed to a position that substantially matches the position of the light source center.

As mentioned above, the reflection screen 8 has a semi-circular tube portion 8*a* that is concentric to the light source center, and at both ends of the semi-circular tube portion 8*a*, there are lateral portions 8*b* that are formed in one piece with the semi-circular portion 8*a*, and that are bent to the rear of the apparatus with respect to the tip portions 6*j* of the optical prism 6.

As shown in the ray tracing diagrams in FIGS. 9 and 10, the light rays emitted from the light source center do not leak from the total reflection surfaces 6*d* and 6*d'* of the optical prism 6, but within the light rays emitted from a position that is slightly off the center of the light source, there are light rays that leak from the total reflection surfaces 6*d* and 6*d'*. For this reason, by providing the reflection screen 8 with the lateral portions 8*b*, the light rays leaked from the total reflection surfaces 6*d* and 6*d'* are reflected at the lateral portions 8*b*, and are incident again from the total reflection surfaces 6*d* and 6*d'* of the optical prism 1.

As shown in FIG. 7, the lateral portions 8*b* of the reflection screen 8 are formed along the total reflection surfaces 6*d* and 6*d'* of the optical prism 6, so that also the light that is reflected at the lateral portions 8*b* and incident again at the total reflection surfaces 6*d* and 6*d'* can be effectively utilized as object illumination light.

The following is an explanation of the ideal shape of the optical prism 6. Regarding the shape of the optical prism 6 of the present embodiment, the same shape as the ideal shape of the optical prism 1 explained in Embodiment 1 is preferable. The following is a discussion, applying actual numbers, of whether the Expressions (1) and (2) explained in Embodiment 1 are also true for the optical prism 6 of the present embodiment.

In the present embodiment, the aperture height D of the outgoing surface 6b of the optical prism 6 is 3.0 mm, and the maximum height A of the total reflection surfaces 6d and 6d' of the optical prism 6 is 4.69 mm. From these numbers, it follows that the value of D/A in Expression (1) is 0.64, which is within the range of Expression (1).

In the present embodiment, the distance L from the tips of the outgoing surface 6b of the optical prism 6 to the maximally outer contour of the total reflection surfaces 6d and 6d' of the optical prism 6 is 1.4 mm, and the distance B from the maximally outer contour of the total reflection surfaces 6d and 6d' of the optical prism 6 to the light source center is 3.34 mm. From these numbers, it follows that L/B in Expression (2) is 0.42, which is within the range of Expression (2).

Referring to FIG. 11, the following is an explanation of the structure of the flashlight emitting apparatus with regard to the axial direction of the flashlight discharge tube 7. FIG. 11 is a cross-sectional view of a flashlight emitting apparatus taken along the axial direction of the flashlight discharge tube 7, and the same numerals are given to members corresponding to those explained for FIGS. 7 to 10.

Reflection surfaces 6e and 6e' are formed on the lateral surface of the optical prism 6, but different from Embodiment 1, these reflection surfaces 6e and 6e' are formed with an evading shape such that light rays incident the optical prism 6 will not be incident on the reflection surfaces 6e and 6e', and the refraction optical system made of a Fresnel lens that is arranged on the outgoing surface side of the optical prism 6 is not affected.

Another characteristic feature of the shape of the outgoing surface 6b of the optical prism 6 is that the end faces located at both ends in longitudinal direction of the outgoing surface 6b are slanted surfaces 6f and 6f'. Thus, it can be repressed that light rays that are emitted from the light source and that are directed within the necessary irradiation angle range escape at the two ends of the outgoing surface 1b, and the distracting sensation at the seam to the cover 9 serving as the outer member of the camera body 26 can be eliminated.

On the other hand, the shape of the central region of the outgoing surface 6b differs greatly from that in Embodiment 1. That is to say, the central region of the outgoing surface 6b is configured as a cylindrical lens having a negative refractive power, and is configured such that it does not adversely affect the condensing effect with regard to the vertical direction of the apparatus. Moreover, the peripheral regions of the outgoing surface 6b outside the central region are provided with a plurality of small prism surfaces 6h and 6h' and Fresnel lens surfaces 6i and 6i'.

The peripheral regions of the outgoing surface 6b (that is, the small prism surfaces 6h and 6h' as well as the Fresnel lens surfaces 6i and 6i') are configured such that, while taking advantage of the above-described condensing ability of the flashlight discharge tube 7 with regard to the radial direction, also the condensing ability of the flashlight discharge tube 7 with regard to the axial direction is increased. Thus, it is possible to realize an illumination optical system with an overall very high condensing ability, due to the condensing effects in the radial direction and the axial direction of the flashlight discharge tube 7.

In this embodiment, an example of an illumination optical system was shown in which the light rays emitted from the flashlight discharge tube 7 serving as the light source are condensed to an extremely narrow range by using an optical prism 6. However, the present invention is not limited to the form of the optical prism 6 in the above-described Embodiment 2.

For example, the outgoing surface 6b of the optical prism 6 in the present embodiment includes a plurality of small prism surfaces 6h and 6h' and Fresnel lens surfaces 6i and 6i' whose vertical angle is a constant angle, but it is not necessarily required to include both, and instead it is also possible to include only one of the two. Moreover, in the present embodiment, the outgoing surface 6b of the optical prism 6 includes a cylindrical lens having negative refractive power, but it is not necessarily required to include this cylindrical lens having negative refractive power, and instead of a cylindrical lens, it is also possible to use a plurality of prisms having with constant vertical angle. Moreover, the peripheral regions of the outgoing surface 6b are configured with Fresnel lenses, but these regions can also be configured with lenses having positive refractive power.

Embodiment 3

Referring to the drawings, the following is a description of a flashlight emitting apparatus (illumination apparatus) according to Embodiment 3 of the present invention. FIGS. 13 to 19 illustrate a flashlight emitting apparatus according to this embodiment. The flashlight emitting apparatus of this embodiment is of the type in which the irradiation angle can be varied.

Figure 13:
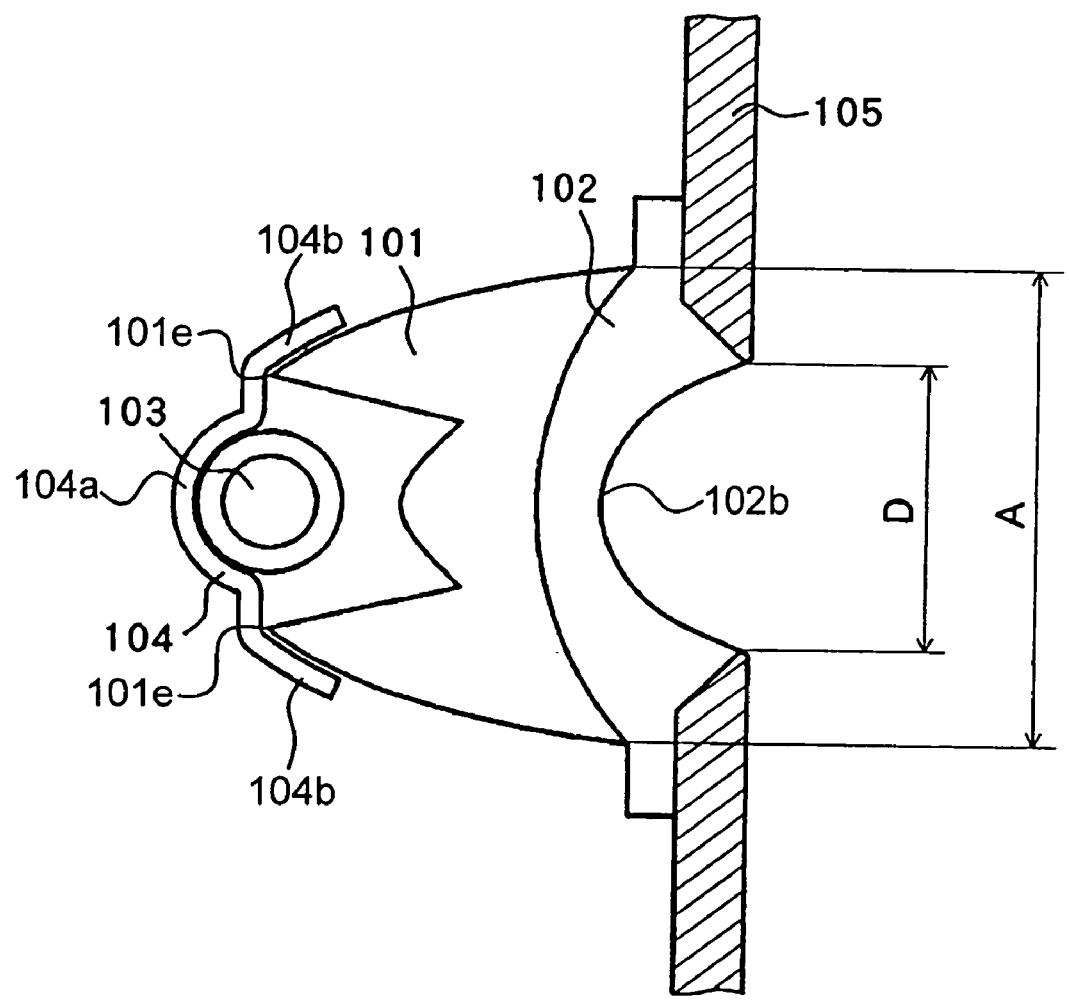
FIG. 13 is a cross-sectional view of a flashlight emitting apparatus according to Embodiment 3 of the present invention, taken along the radial direction of the flashlight discharge tube (condensing state).
Figure 14:
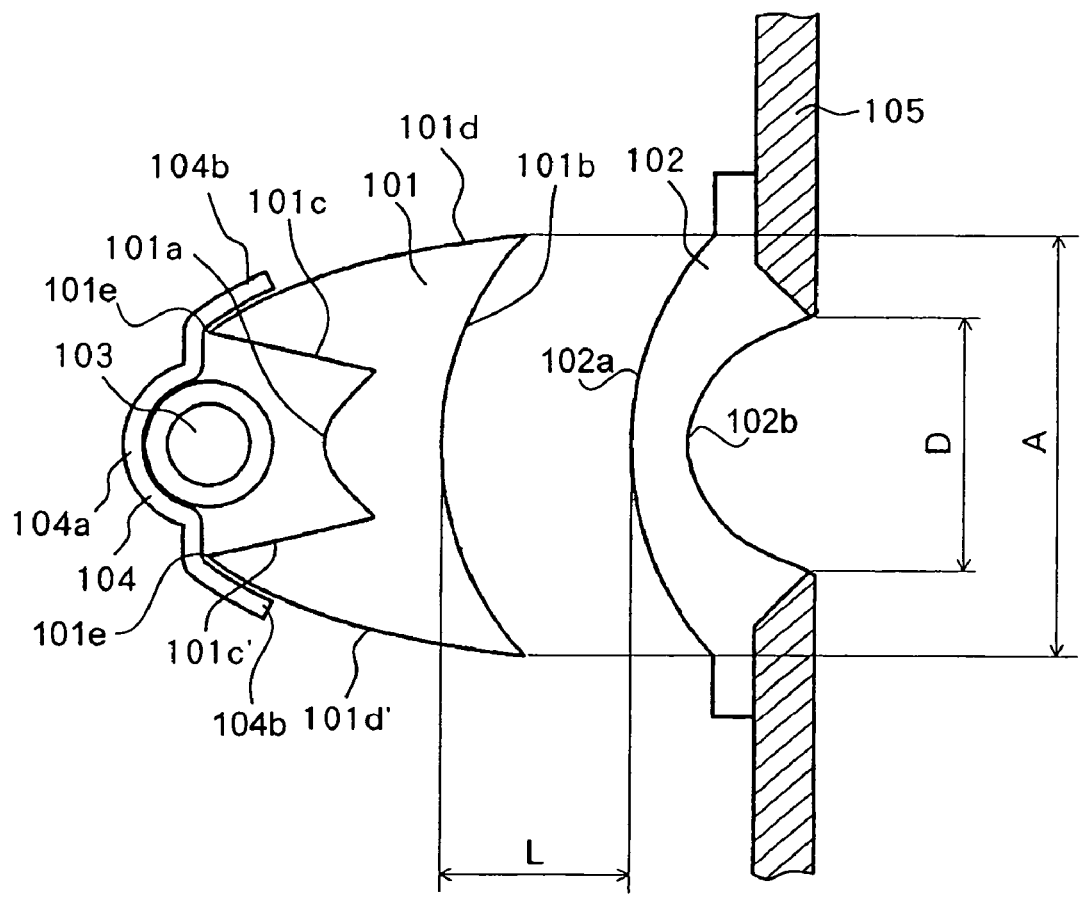
FIG. 14 is a cross-sectional view of a flashlight emitting apparatus according to Embodiment 3 of the present invention, taken along the radial direction of the flashlight discharge tube (divergent state).
Figure 15:
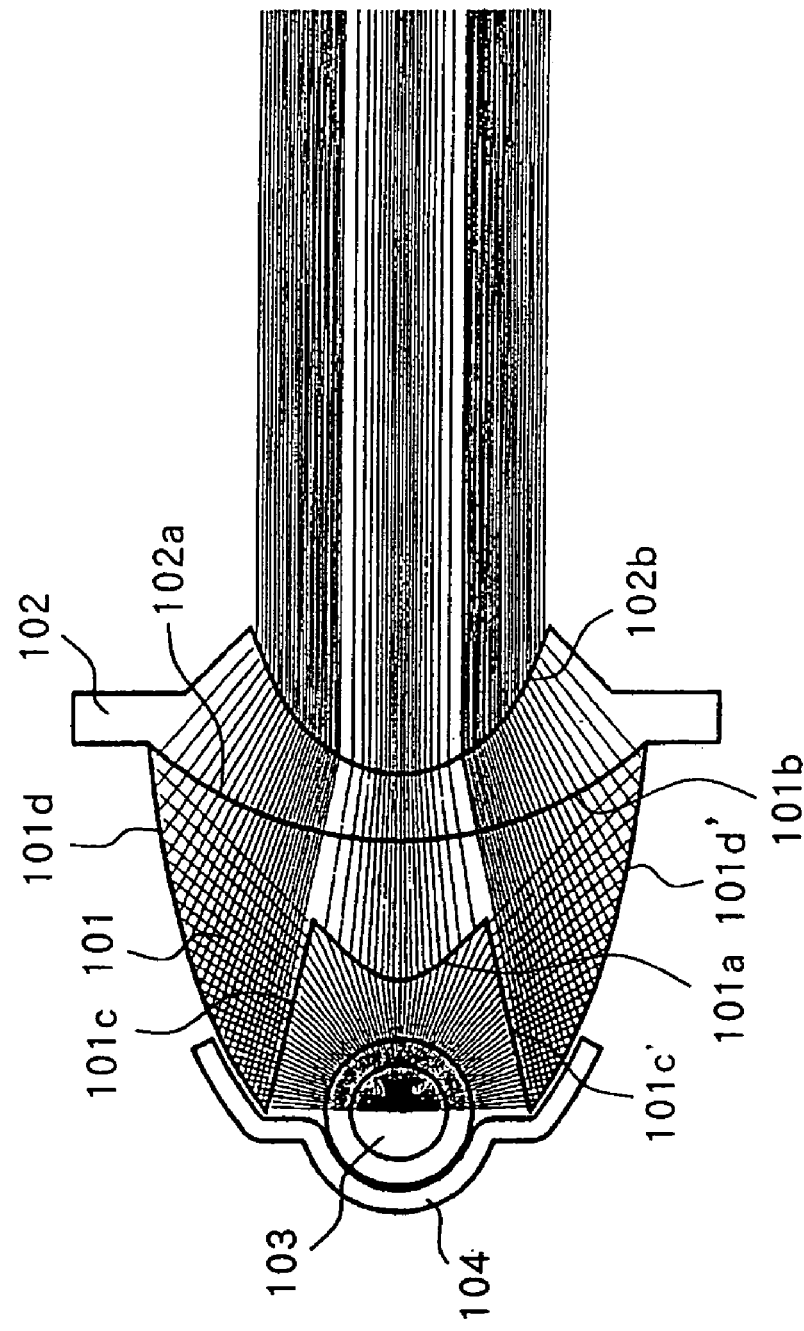
FIG. 15 is a diagram showing the distribution of light rays from the light source in Embodiment 3 of the present invention (condensing state).
Figure 16:
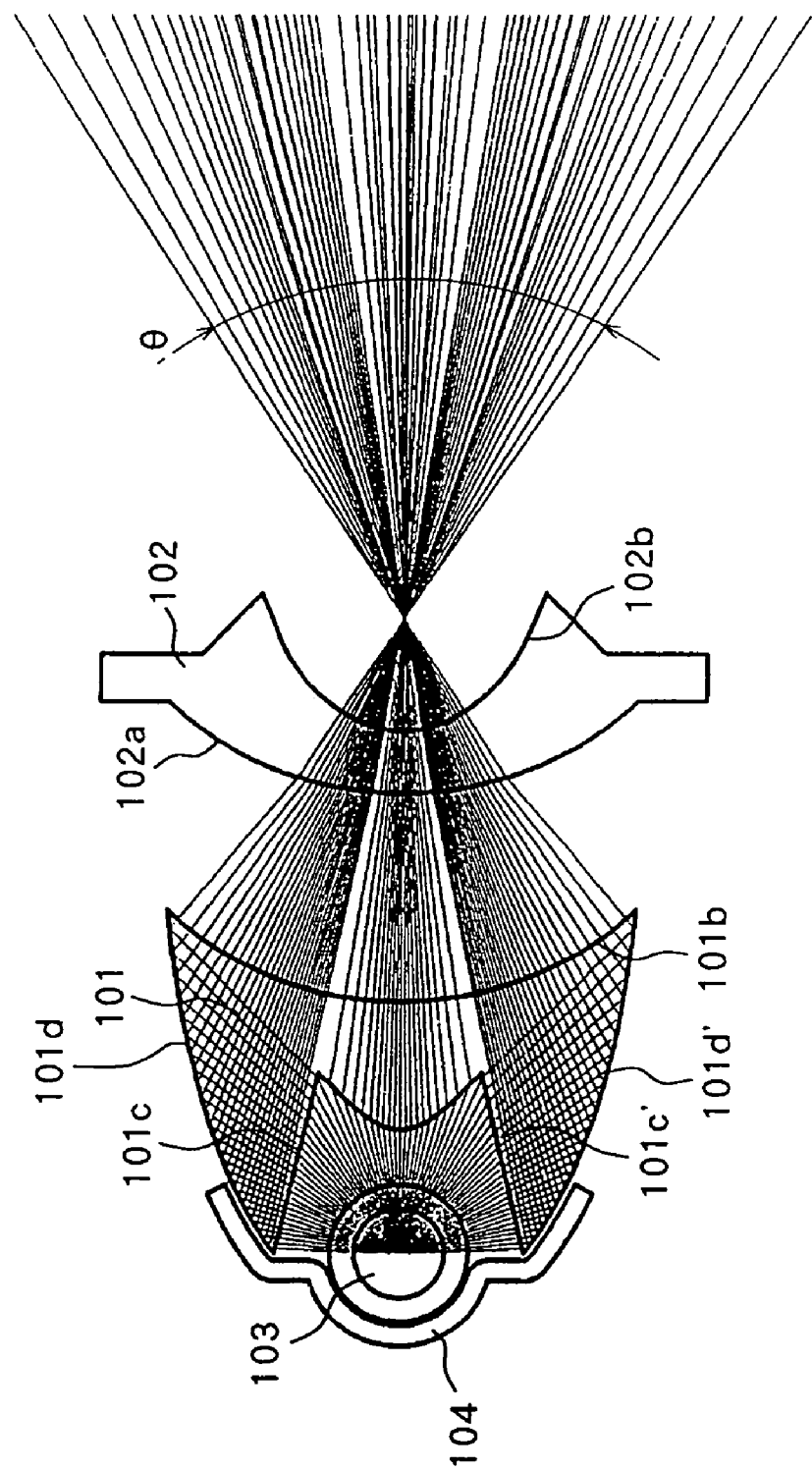
FIG. 16 is a diagram showing the distribution of light rays from the light source in Embodiment 3 of the present invention (divergent state).
Figure 17:
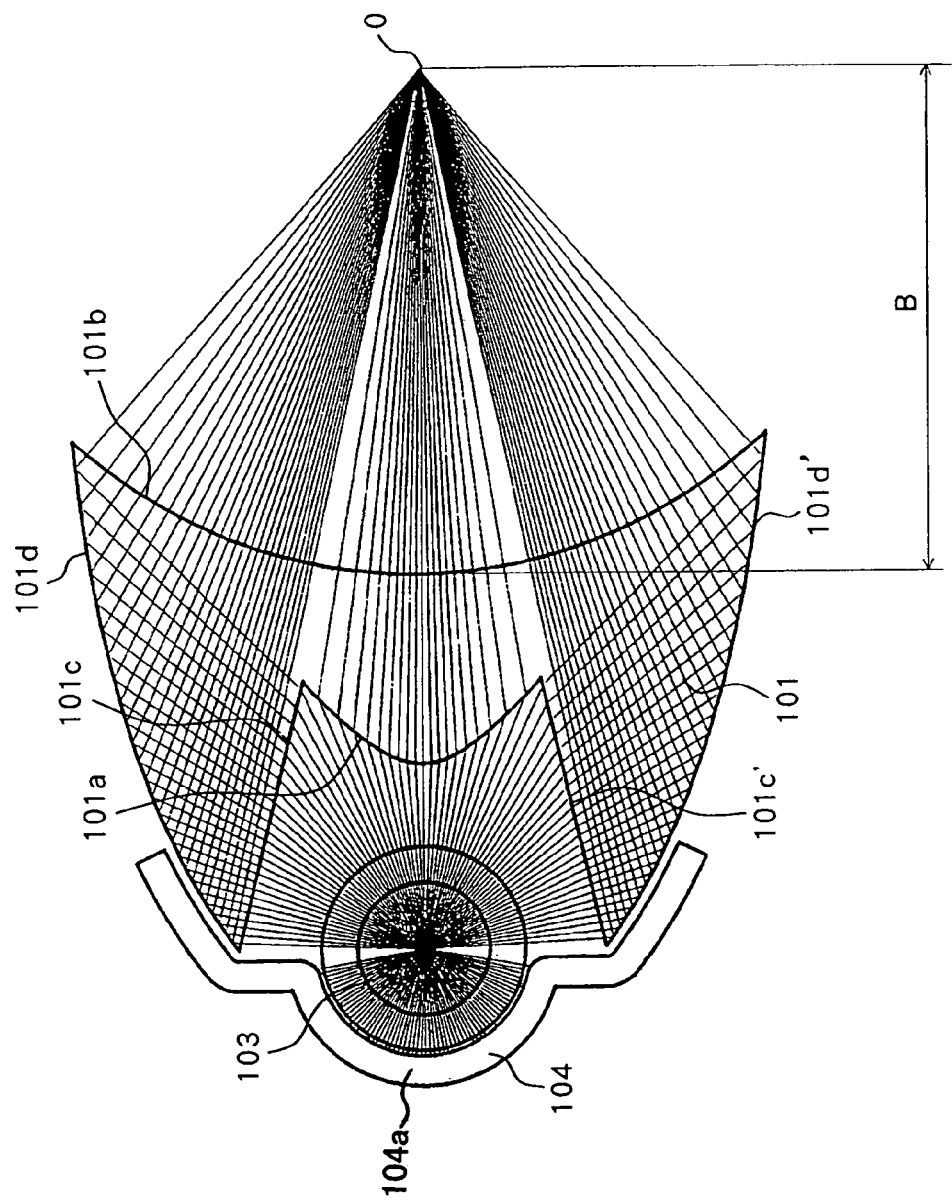
FIG. 17 is a diagram illustrating the concept behind the shape of the condensing optical system according to Embodiment 3 of the present invention.
Figure 18:
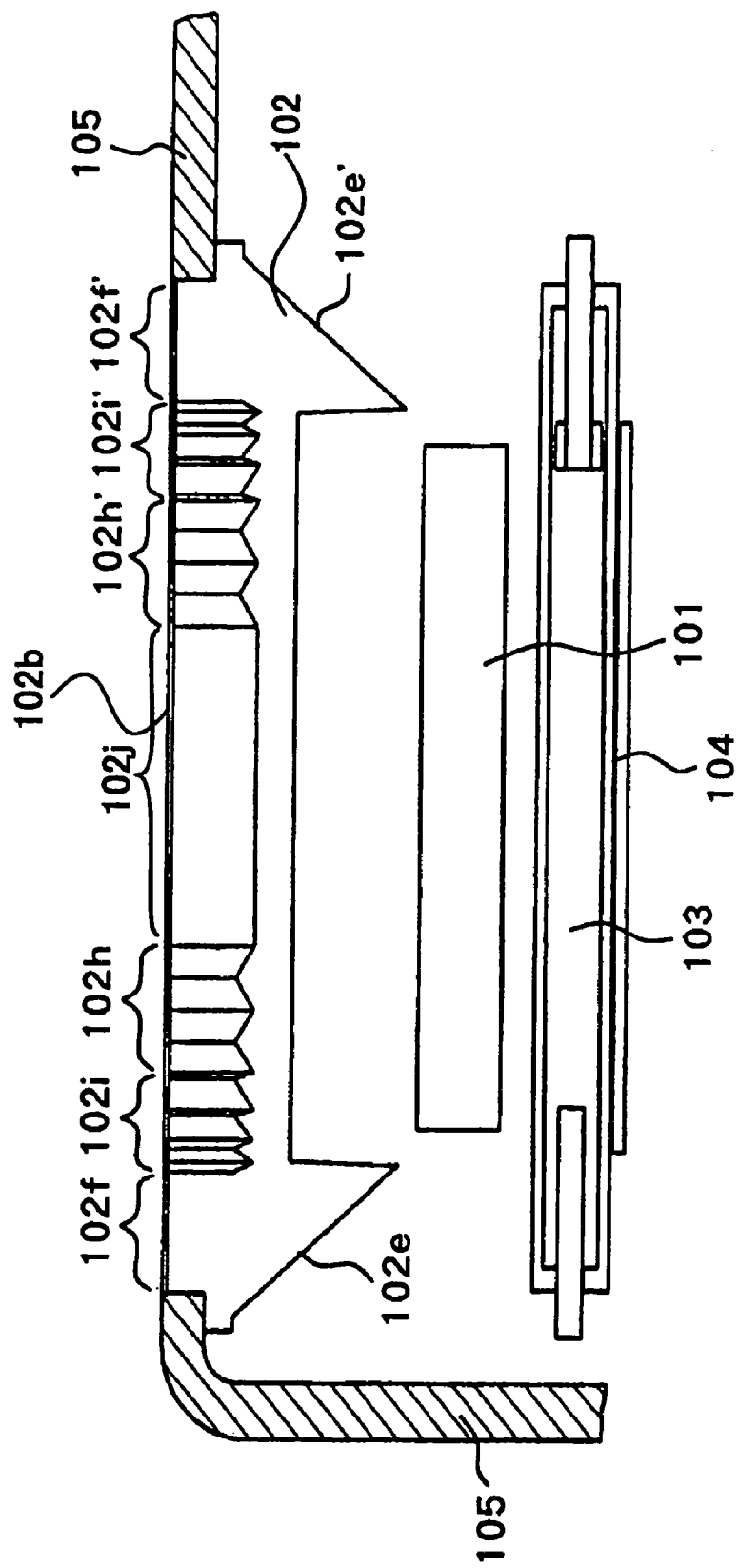
FIG. 18 is a cross-sectional view of a flashlight emitting apparatus according to Embodiment 3 of the present invention, taken along the longitudinal direction of the flashlight discharge tube.

FIGS. 13 and 14 are cross-sectional views of the flashlight emitting apparatus, along the radial direction of the flashlight discharge tube. FIGS. 15 and 16 are diagrams in which ray tracing of the light emitted from the light source center has been added to the cross-sectional views of FIG. 13 and 14. FIG. 17 illustrates the shape of the optical prism. FIG. 18 is a cross-sectional view of a flashlight emitting apparatus along the axial direction (longitudinal direction) of the flashlight discharge tube, and FIG. 19 is an exploded perspective view showing the structure of the essential components of the flashlight emitting apparatus.

Figure 19:
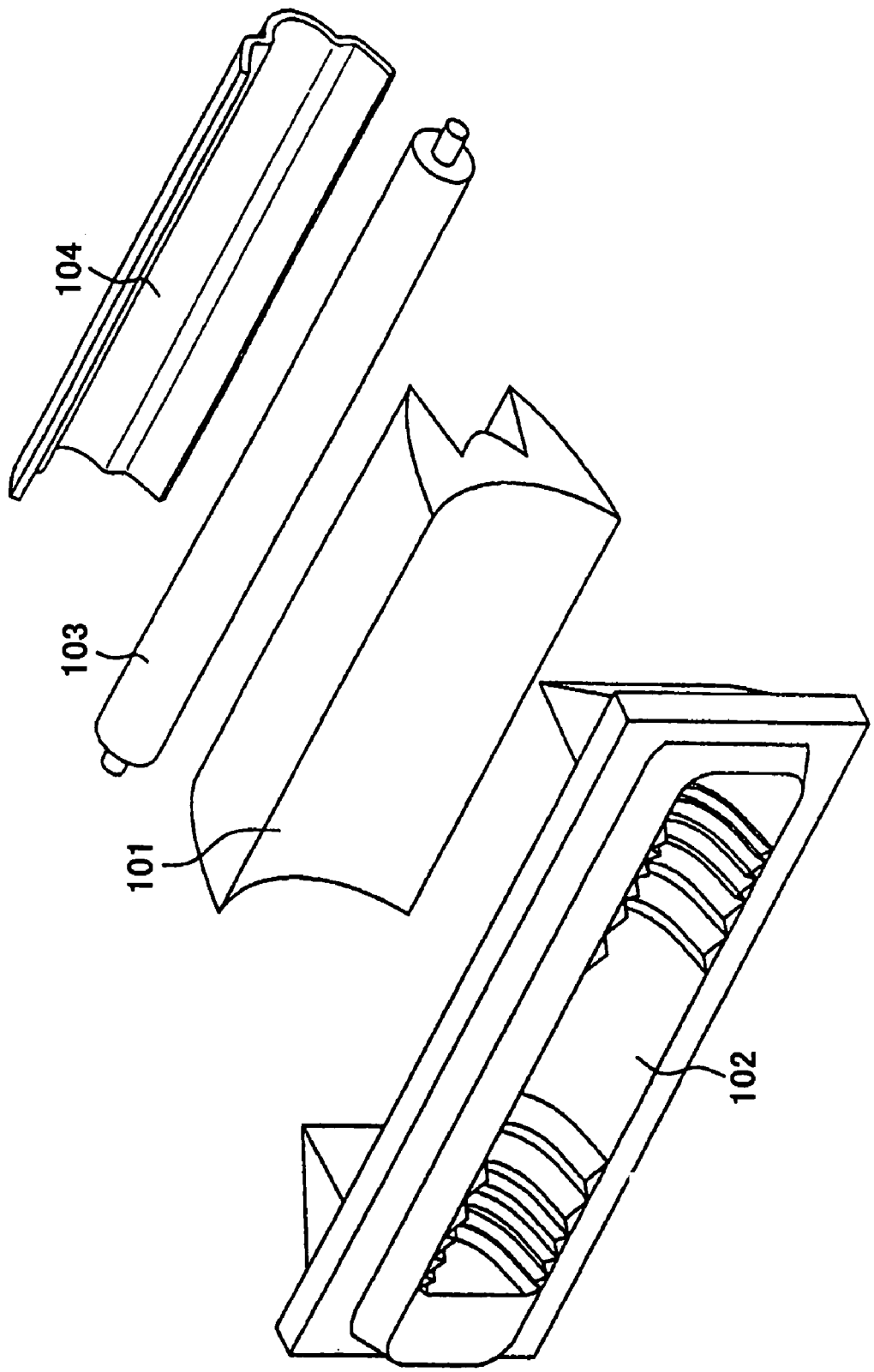
FIG. 19 is an exploded perspective view showing the structure of the essential components of the flashlight emitting apparatus according to Embodiment 3 of the present invention.

FIG. 19, which is an exploded perspective view illustrating the internal structure of the flashlight emitting apparatus, shows the essential components of the flashlight emitting apparatus, but does not show holding members or lead wires.

In FIG. 19, numeral 101 denotes a first optical prism that is arranged on the light source side of the flashlight emitting apparatus. Numeral 102 denotes a second optical prism that is arranged further to the front of the apparatus than the first optical prism 101. These optical prisms 101 and 102 are made of a glass material or optical resin material with high transmittivity such as acrylic resin.

Numeral 103 denotes a tube-shaped flashlight discharge tube (xenon tube) that emits flashlight when a trigger signal is input into it. Numeral 104 denotes a reflection screen that reflects to the emission side (to the front of the apparatus) those components of the light rays emitted from the flashlight discharge tube 103 that have been emitted to the rear of the apparatus. The inner surface (reflection surface) of this reflection screen 104 is made of a metallic material having high reflectivity, such as brilliance aluminum or the like.

The flashlight emitting apparatus of this embodiment is provided in a camera as described in Embodiment 1 (FIG. 6). In the following, members that are the same as those described in FIG. 6 are given the same numerals.

The following is a description of the camera operation, when a camera provided with a flashlight emitting apparatus of the present embodiment has been set to the "strobe auto-mode," for example.

When the user pushes the release button 21 half down, the brightness of the external light is measured by the light metering device, and the result of the light measurement is sent to a central processing unit arranged inside the camera body 26. Depending on the brightness of the external light and the sensitivity of the imaging medium (film or image pickup element, such as a CCD), the central processing unit judges whether the flashlight emitting apparatus should emit light or not.

Then, if it is judged that the flashlight emitting apparatus should emit light, then, by giving out a light emission signal to the flashlight emitting apparatus when the release button 21 is pushed completely down, the central processing unit lets the flashlight discharge tube 103 emit light via a trigger lead wire (not shown in the drawings) that is attached to the reflection screen 104. Here, those light rays emitted from the flashlight discharge tube 103 that are emitted in the direction opposite from the illumination direction (to the front of the apparatus) are reflected by the reflection screen 104 arranged at the rear of the apparatus and are guided in the irradiation direction. Moreover, the light rays that are emitted in the irradiation direction are directly incident on the first optical prism 101 arranged at the front of the apparatus, and after being incident on the second optical prism 102 and converted to predetermined light distribution characteristics, they are irradiated onto the object.

The main aspects of the flashlight emitting apparatus of the present embodiment are that the size, in the vertical direction of the apparatus, of the outgoing aperture portion of the second optical prism 102 that has been arranged on the object side (to the front of the apparatus) as can be made small, as explained below, and the light distribution characteristics can be optimized. Referring to FIGS. 13 to 17, the following is a more detailed description of a method for setting the optimum shape of the flashlight emitting apparatus (optical prisms 101 and 102).

FIGS. 13 to 17 are vertical cross-sectional views of the flashlight emitting apparatus, taken along the radial direction of the flashlight discharge tube. In these drawings, numeral 101 denotes the first optical prism, which condenses the light rays emitted from the light source (the flashlight discharge tube 103) to substantially one point on the optical axis in a plane including the radial direction of the flashlight discharge tube 103. Numeral 102 denotes the second optical prism, which has negative refractive power and is arranged further to the light source side than the focus point of the light rays formed by the first optical prism 101.

In the present embodiment, the relative distance in the optical axis direction between the first optical prism 101 and the second optical prism 102 can be changed, and thus the irradiation angle range of the light rays (illumination light) that are irradiated from the flashlight emitting apparatus can be changed. The driving of the first optical prism 101 and the second optical prism 102 is performed by an illumination driving mechanism (not shown in the drawings), which is linked to a zoom driving mechanism performing the zoom driving of the image-taking optical system. With this structure, the irradiation angle range of the flashlight emitting apparatus can be changed in accordance with the zooming of the image-taking optical system.

Numeral 103 denotes a tube-shaped flashlight discharge tube, which emits flashlight when a trigger signal is input into it. Numeral 104 denotes a reflection screen, which has a semi-circular tube portion 104a that is concentric to the flashlight discharge tube 103, and numeral 105 denotes a cover serving as an outer member of the camera body 26.

As shown in FIGS. 13 and 14, the second optical prism 102 is fastened integrally to the cover 105 by gluing or the like. On the other hand, the first optical prism 101 is fastened to the flashlight discharge tube 103 and the reflection screen 104 by a holding member (not shown in the drawings) in a state in which a predetermined positional relation to those members is preserved. Moreover, the unit made of the first optical prism 101, the flashlight discharge tube 103 and the reflection screen 104 can be moved in the optical axis direction by a driving mechanism, which is not shown in the drawings.

FIGS. 13 and 15 show the positional relation of the optical prisms 101 and 102 in the flashlight emitting apparatus of the present embodiment when the light rays emitted from the light source are condensed the most, that is, when the irradiation angle range is the narrowest. On the other hand, FIGS. 14 and 16 show the positional relation of the optical prisms 101 and 102 in the flashlight emitting apparatus of the present embodiment when the light rays emitted from the light source diverge uniformly, that is, when the irradiation angle range is the broadest.

In addition to the cross section views of FIGS. 13 and 14, FIGS. 15 and 16 also show the tracing of representative light rays emitted from a radially central portion of the flashlight discharge tube 103, and illustrate the distribution of the light rays emitted from the light source center as they travel toward the object. It should be noted that in FIGS. 13 to 16, apart from positional relation in the optical axis direction, the structure and shape of the optical system is the same.

With the flashlight emitting apparatus of the present embodiment, by combining the two optical prisms 101 and 102, the size of the overall illumination optical system can be made small, and the irradiation angle range can be gradually changed while keeping the light distribution characteristics uniform. Moreover, the most important characteristic feature of the present embodiment is that the height (in the vertical direction of the apparatus) of that aperture portion with which light is irradiated to the outside of the apparatus can be made small. The following is a detailed description of the characteristics of the shape of the illumination optical system and the behavior of the light rays that are emitted from the flashlight discharge tube 103.

First, the behavior of the light rays in an actual illumination optical system is described using the ray tracing diagrams shown in FIGS. 15 and 16. FIG. 15 shows the inner and outer diameter of a glass tube serving as the flashlight discharge tube 103. As for the light-emitting phenomenon of the flashlight discharge tube 103 with which the flashlight emitting apparatus is provided, it can be assumed that, in order to improve the light emission efficiency, light emission is mostly caused at the entire inner diameter of the flashlight discharge tube 2, and light emission is substantially uniform at the entire inner diameter of the flashlight discharge tube 103.

On the other hand, at the design stage, in order to efficiently control the light that is emitted from the flashlight discharge tube 103 serving as the light source, it is preferable to design the shape of the illumination optical system under the assumption that there is an ideal point light source at the center of the light source, rather than simultaneously taking into account all light rays over the entire inner diameter of the flashlight discharge tube 103. Then, efficient design is possible if, after the shape of the illumination optical system has been designed, a correction is performed in consideration of the fact that the light source has a finite size. Also this embodiment follows this approach, and the center of the light source is taken as the reference value when determining the shape of the illumination optical system, and the shape of all the portions of the optical prisms 101 and 102 is set as described below.

First, the shape of the first optical prism 101, which can also be said to be the most significant characteristic feature of the present embodiment, is explained in detail with reference to FIG. 17. FIG. 17 shows the state when the second optical prism 102 has been removed from the state shown in FIGS. 15 and 16, and shows a ray tracing diagram of the light rays emitted from the light source center.

As shown in FIG. 17, the first optical prism 101 condenses the light rays emitted basically from the light source center on one point O (focus point) on the optical axis. The shape of the various portions of the first optical prism 101 is described in detail in the following.

First, those components of the light rays emitted from the light source center for which the angle formed with the optical axis is small are incident on the ingoing surface 101a that is provided on the light source side of the first optical prism 101. This ingoing surface 101a is made of a cylindrical lens with a convex surface. Then, the light rays that have passed through the ingoing surface 101a pass through the outgoing surface 101b, and are condensed onto the focus point O.

On the other hand, those components of the light rays emitted from the light source center for which the angle formed with the optical axis is large are incident on the ingoing surfaces 101c and 101c' that are formed on the light source side of the first optical prism 101, and after they have been refracted by these ingoing surfaces 101c and 101c', they are guided to the total reflection surfaces (reflective portions) 101d and 101d'. Then, the light rays reflected at the total reflection surfaces 101d and 101d' pass through the outgoing surface 101b and are condensed onto the focus point O on the optical axis.

The light rays emitted from the light source center that travel toward the rear of the apparatus are reflected by the reflection screen 104. The reflection screen 104 has a semi-circular tube portion 104a that is concentric to the tube-shaped flashlight discharge tube 103, so that the light rays that are reflected by the semi-circular tube portion 104a of the reflection screen 104 are guided back to the vicinity of the light source center. After that, they are condensed onto the focus point O on the optical axis, taking the same optical path as the light rays traveling toward the emission direction from the light source center, as described above. As a result, basically all light rays emitted from the light source center are condensed on the focus point O on the optical axis.

Here, the surface shape of the outgoing surface 101b of the first optical prism 101 is determined such that all the light rays incident on this surface are incident on it at a substantially right angle (that is, in normal direction). If the surface shape of the outgoing surface 101b were not determined in this manner, then there would be components with light loss due to surface reflections at the outgoing surface 101b, when the light rays are emitted from the first optical prism 101.

Furthermore, as shown in FIG. 17, the light rays emitted from the light source center reach the outgoing surface 101b of the optical prism 101 without crossing one another, and moreover, arranged next to one another in order on the outgoing surface 101b with respect to the angles at which they are emitted from the light source center.

The ingoing surfaces 101c and 101c' of the optical prism 101 are made of surfaces forming a relatively large angle with the optical axis, because, if the inclination angle of the ingoing surfaces 101c and 101c' with respect to the optical axis were small, then some components of the light rays emitted from the light source center would undergo total reflection at the ingoing surfaces 101c and 101c', and the light rays emitted from the light source would be directed in a direction that is different from the intended direction of the ray tracing shown in FIG. 17. Thus, by providing the ingoing surfaces 101c and 101c' with a predetermined inclination, the present embodiment prevents the occurrence of components that are totally reflected by the ingoing surfaces 101c and 101c'.

Thus, by devising the shapes of the various parts of the optical prism 101 as described above, the light rays emitted from the light source can be condensed on the focus point O on the optical axis, allowing a structure that is suitable for configuring an illumination optical system with which the irradiation angle range can be varied, as described below.

The following is a description of the positional relation between the optical prisms 101 and 102 of the flashlight emitting apparatus of the present embodiment, when changing the irradiation angle.

In the state shown in FIGS. 13 and 15, the light rays emitted from the flashlight emitting apparatus are condensed the most. In this state, the outgoing surface 101b of the first optical prism 101 and the ingoing surface 102a of the second optical prism 102a are the closest. In the present embodiment, the outgoing surface 101b of the optical prism 101 and the ingoing surface 102a of the optical prism 102a are formed with such shapes that they can be fitted to one another without a gap, so that in this state the optical prism 101 and the optical prism 102 are substantially in surface contact with one another.

On the other hand, the outgoing surface (negative lens portion) 102b of the second optical prism 102 is configured by an extremely concave cylindrical lens, so that light rays passing through this surface are converted such that they travel in a direction substantially parallel to the optical axis. Moreover, by arranging the second optical prism 102 such that the outgoing surface 102 is positioned more on the light source side than the focus point O, as shown in FIG. 17, the light rays from the light source can be emitted with high condensing efficiency from the outgoing surface 102b.

The state shown in FIG. 15 is the most extreme state, and by converting the light rays emitted from the light source center with the first optical prism 101 and the second optical prism 102 into light rays that are parallel to the optical axis, it is possible to attain a state in which the irradiation angle range is narrowest and the condensing degree is the highest.

On the other hand, FIGS. 14 and 16 are diagrams showing the state when the first optical prism 101 and the second optical prism 102 are spaced apart by a certain distance L. As shown in these drawings, by increasing the distance between the first optical prism 101 and the second optical prism 102, it is possible to change from the most condensed state shown in FIG. 15 to a state in which the light rays emitted from the light source center are broadened by an irradiation angle range θ, as shown in FIG. 16.

FIGS. 15 and 16 respectively show the states with the narrowest and the broadest irradiation angle range, but the irradiation angle ranges of the flashlight emitting apparatus of this embodiment are not limited to these two states. That is to say, by stopping the first optical prism 101 at a suitable position, and changing the distance between the first optical prism 101 and the second optical prism 102, it is possible to set the irradiation angle range to any range between the state shown in FIG. 15 and the state shown in FIG. 16. Moreover, it is possible to change the irradiation angle range gradually during the movement stroke of the first optical prism 101, and to convert the light emitted from the light source for any irradiation angle range such that it has a uniform light distribution.

Thus, by arranging the second optical prism 102 having a negative refractive power at a position that is closer to the light source side than the focus point O that is formed by the light rays emitted from the first optical prism 101, and by changing the positional relation of the two optical prisms on the optical axis, it is possible to change the irradiation angle range.

As can be seen from FIGS. 15 and 16, the change of this irradiation angle range is determined by the position with respect to the focus point O of the outgoing surface 102b (concave lens surface) of the second optical prism 102. That is to say, as shown in FIG. 15, a high condensing ability can be obtained when the light rays emitted from the light source pass through all of the regions of the outgoing surface 102b of the second optical prism 102.

Furthermore, as shown in FIG. 16, when the light rays pass only through the region of the outgoing surface 102b with small curvature near the optical axis, then the irradiation angle range is broadened by weakening the condensing power, and uniform light distribution characteristics can be attained over this broad range.

On the other hand, as shown in FIGS. 13 to 16, the region of the outgoing surface 102b of the second optical prism 102 (region through which the light rays emitted from the light source center in the outgoing surface 102b) becomes narrower than the region of the outgoing surface 101b of the first optical prism 101 (region through which the light rays emitted from the light source center in the outgoing surface 101b), and from immediately before entering the first optical prism 101 until immediately after leaving the second optical prism 102, the irradiation angle range becomes extremely narrow. For this reason, the light rays can be emitted with high condensing efficiency from a narrow outgoing aperture portion.

Moreover, the light rays that have passed through the ingoing surface (positive lens portion) 101a and the light rays that have passed through the ingoing surfaces 101c and 101c' of the first optical prism 101 are all emitted from the outgoing surface 101b, and this outgoing surface 101b is configured as a continuously curved surface. Thus, machining of the outgoing surface 101b becomes easy, and discrepancies due to machining precision or positional shifts when assembling the illumination optical system do not occur. That is to say, even when the position of the light rays that reach the outgoing surface 101b is slightly shifted, this hardly affects the optical characteristics, and consistent optical characteristics without irregularities in the light distribution can be attained, because there are no discontinuities in the outgoing surface 101b and the changes in the surface shape are small.

The above is also the same when assuming that the size of the light source has a certain constant size, so that considerable changes in the optical characteristics also tend not to occur and continuous changes in the optical characteristics are attained with respect to changes in the size of the light source. Thus, this structure is advantageous for providing illumination optical systems with a uniform light distribution.

Moreover, the outgoing surface 102b of the second optical prism 102 is not made of a complicated surface, but of a single concave surface, so that, in addition to the above-described effects of the outgoing surface 101b, there is the advantage that it can also be used directly as an external component of the flashlight emitting apparatus.

One of the most significant characteristic features of this embodiment is that in the illumination optical system using the optical prisms 101 and 102, it is possible to reduce the size of only the outgoing surface 102b, while taking advantage of the characteristic features of miniaturization and high condensing efficiency. That is to say, the total length and height required for the illumination optical system is made much smaller than in the prior art, and if the light source is tiny enough, then there are clearly no light rays for which light loss occurs. And moreover, the outgoing aperture portion (outgoing surface 102b) of the flashlight emitting apparatus that is apparent (i.e. that can be seen from outside the camera) can be made smaller, while making the overall illumination optical system smaller.

Referring to FIGS. 13 and 14, the following is a description of the ideal shape of the illumination optical system of the present embodiment. FIGS. 13 and 14 are cross-sectional views of a flashlight emitting apparatus taken along the radial direction of the flashlight discharge tube 103, and show the positional relation between a cover 105 serving as an outer member of the camera body 26 and the illumination optical system.

As illustrated in FIGS. 15 and 16, it is the outgoing surface 102b of the second optical prism 102 that functions as the outgoing surface of the illumination optical system, so that the cover 105 is formed such that also at the outgoing aperture portion of the illumination optical system of the camera, only the outgoing surface 102b is exposed to the outside of the camera. Thus, the size (with respect to the vertical direction of the camera) of the outgoing aperture portion of the illumination optical system can be made such that it looks the smallest, and the characteristic features of the present embodiment can be utilized best.

Moreover, the tip portions 101e of the first optical prism 101 that are formed on the light source side are configured such that they extend to a position corresponding to the light source center, as shown in FIGS. 13 and 14. The reason for this is that if the tip portions 101e of the optical prism 101 are positioned further to the front of the apparatus than a position corresponding to the light source center, then those components of the light rays emitted from the light source that are emitted at an angle of substantially 90° to the optical axis (i.e. upward or downward in the drawings) cannot be picked up, and the light rays emitted from the light source cannot be condensed efficiently.

If, on the other hand, the tip portions 101e of the optical prism 101 are formed such that they extend to the rear of the apparatus behind the position corresponding to the light source center so as to try to gather all of the light emitted from the light source with high efficiency, then the overall optical prism (first optical prism 101) becomes large. And moreover, it becomes difficult to totally reflect the light rays emitted from the light source with the reflection surfaces 101d and 101d', and the components leaking from the optical prism 101 increase, so that the light rays emitted from the light source cannot be utilized efficiently.

For this reason, with regard to the condensing efficiency and size of the illumination optical system, it is preferable that the tip portions 101e of the optical prism 101 are formed to a position that substantially matches the position of the light source center.

As mentioned above, the reflection screen 104 has a semi-circular tube portion 104a that is concentric to the light source center, and at both vertical ends of the semi-circular tube portion 104a, there are lateral portions 104b that are formed in one piece with the semi-circular portion 104a, and that are bent behind the tip portions 101e of the optical prism 101. As shown in the ray tracing diagrams in FIGS. 15 and 16, the light rays emitted from the light source center do not leak from the total reflection surfaces 101d and 101d' of the optical prism 101, but within the light rays emitted from a position that is slightly off the center of the light source, there are light rays that leak from the total reflection surfaces 101d and 101d'. For this reason, by providing the lateral portions 104b, the light rays leaked from the total reflection surfaces 101d and 101d' are incident again from the total reflection surfaces 101d and 101d' of the optical prism 101.

As shown in FIGS. 13 and 14, the lateral portions 104b of the reflection screen 104 are formed along the total reflection surfaces 101d and 101d' of the optical prism 101, so that also the light that is reflected at the lateral portions 104b and incident again at the total reflection surfaces 101d and 101d' can be effectively utilized as object illumination light.

The following is an explanation of the ideal shape of the optical prisms 101 and 102. First, the ideal shape of the dimensions in vertical direction of the illumination optical system is explained.

In FIG. 13, it is preferable that the aperture height D of the outgoing surface 102b of the second optical prism 102 is within the range of the Expression (3) below. That is, the ratio between the aperture height D of the outgoing surface 102b of the second optical prism 102 and the maximum height A constituted by the total reflection surfaces 101d and 101d' of the first optical prism is given by:

$$0.4 \leq D/A \leq 0.8 \quad (3)$$

In order to adapt to new camera designs, it would be ideal to make the aperture height D as narrow as possible, but depending on the size of the flashlight discharge tube 103 serving as the light source, the light loss becomes larger as the length of the aperture height D is shortened, and it may not be possible to configure an effective condensing optical system.

That is to say, if the aperture height D of the outgoing surface 102b in the vertical direction of the apparatus is reduced, and the size of the light source (diameter of the flashlight discharge tube 103) is increased, the light that travels directly to the outgoing surface 102b of the second optical prism 102 is reduced, and the components that repeatedly undergo-total reflection inside the optical prisms 101 and 102 are increased. As a result, most of the components that would have been emitted from the outgoing surface 102b are emitted from other portions of the optical prisms 101 and 102, and those components of the light rays emitted from the light source that can be used effectively for the illumination of the object are decreased. Consequently, with the above structure, even though the aperture height D in the vertical direction of the apparatus is reduced, it is still not necessarily an ideal illumination optical system with regard to the effective utilization of light rays emitted from the light source.

With regard to this, the lower limit of Expression (3) is the aperture height D that functions effectively as the illumination optical system, if the size (diameter) of the flashlight discharge tube 103 serving as the light source is relatively small. And the upper limit of Expression (3) becomes the aperture height D that functions effectively for the illumination optical system, if the diameter of the flashlight discharge tube 103 is large.

Thus, if the diameter of the flashlight discharge tube 103 is small, the lower limit of Expression (3) is the size of the aperture height D that functions effectively for the illumination optical system, and it follows from the expression that the aperture height D can be made smaller if the flashlight discharge tube 103 is made smaller. However, due to such reasons as the durability and the manufacturing process of the actual flashlight discharge tube 103, there are no flashlight discharge tubes 103 below a certain diameter.

Considering the diameter of flashlight discharge tubes 103 that can be manufactured in practice, then a lower limit for D/A of 0.4 seems appropriate.

On the other hand, if the upper limit 0.8 for D/A in Expression (3) is exceeded, then the aperture height D becomes large, which is not desirable with regard to the object of the present invention, namely to reduce the size of the outgoing aperture portion in the vertical direction of the apparatus.

The following is a discussion of actual numbers for Expression (3) in a flashlight emitting apparatus according to the present embodiment. In the present embodiment, the diameter (inner diameter) of the flashlight discharge tube 2 is φ1.3 mm, the maximum height A of the total reflection surfaces 101d and 101d' of the first optical prism 101 is 6.8 mm, and the aperture height D of the outgoing surface 102b of the second optical prism 102 is 4.5 mm. From these numbers, it follows that the value of the aperture ratio (D/A) in Expression (3) is 0.66, which is within the range of Expression (3).

The following is an explanation of the positional relation of the optical prisms 101 and 102 in the optical axis direction. When L is the spacing between the first optical prism 101 and the second optical prism 102 (see FIG. 14), and B is the distance between the outgoing surface 101b of the first optical prism 101 and the focus point O (see FIG. 17), then it is preferable that the ratio of the distance L and the distance B satisfies the following Expression (4):

$$0 \leq L/B \leq 1.0 \quad (4)$$

With regard to making the illumination optical system small, the distance L is ideally as short as possible. However, a certain length (L) is necessary in order to make the size of the outgoing surface 102b of the second optical prism 102 with respect to the vertical direction of the apparatus small. Moreover, considering the thickness of the cover 105 of the camera body 26, a certain length will be necessary in order to let the outgoing surface 102b of the second optical prism 101 look tiny in the vertical direction of the apparatus.

In the present embodiment, considering these two aspects, the relation of the distance L and the distance B is set such that the Expression (4) is satisfied.

The lower limit 0 in Expression (4) means the state when the first optical prism 101 and the second optical prism 102 are in contact, and this lower limit cannot be undercut. On the other hand, the upper limit is set to 1.0, because when a larger value is taken, then the illumination optical system becomes large in the optical axis direction, and the goal of making the illumination optical system smaller, which is one of the results of the present embodiment, is missed. Moreover, when the distance between the optical prisms 101 and 102 is L/B>1.0, then the light rays directed toward the central region of the outgoing surface 102b become very few, and preferable light distribution characteristics is not likely to be obtained.

The following is a discussion of actual numbers for Expression (4) in a flashlight emitting apparatus according to the present embodiment. In the present embodiment, the distance L (maximum distance between the optical prisms 101 and 102) is 3 mm and the distance B is 5 mm. From these numbers, it follows that L/B is 0.6, which is within the range of Expression (4).

In the present embodiment, the outgoing surface 101b of the first optical prism 101 is configured as a curved surface on which light rays are incident substantially perpendicularly (that is, in normal direction), in order to reduce the light loss. However, the shape of the outgoing surface 101b is not necessarily limited to this curved shape.

For example, it is also possible to make the curvature of the outgoing surface 101b softer, or in the extreme case, planar. In that case, the focus point O becomes closer to the outgoing surface 101b of the first optical prism 101, and it becomes possible to change the irradiation angle considerably with a small movement distance.

However, when the focus point O approaches the light source side, there are more light components for which the outgoing angle from the outgoing surface 101b and the optical axis becomes sharp, and it becomes difficult to condense the light on one point on the optical axis, the design of a concave surface (outgoing surface 101b) with which the condensing can be controlled with the second optical prism 102 becomes difficult, and the light loss due to total reflections inside the optical prism becomes large. And moreover, damage may occur because the lens thickness of the second optical prism 102 becomes more difficult to take away.

However, for an illumination optical system with a variable irradiation angle, an embodiment is advantageous with which miniaturization is possible.

In the present embodiment, the outgoing surface 101b of the first optical prism 101 and the ingoing surface 102a of the second optical prism 102 were configured as concave and convex cylindrical lenses whose surface shapes fit into one another without a gap. However, the shape of the two is not limited to this combination, and they do not necessarily have to fit against one another.

It is also possible to use different surface structures and to make the outgoing surface 101b of the first optical prism 101 planar and the ingoing surface 102a of the second optical prism 102 concave, for example. In any case, at least one of the ingoing surface 102a and the outgoing surface 102b of the second optical prism 102 should be concave, and overall, the second optical prism 102 should have a negative refractive power.

Thus, even if the shape of the outgoing surface 101b of the first optical prism 101 is changed, the irradiation angle range can be changed by moving the first optical prism 101 in the optical axis direction. Also in this case, it is preferable that the first optical prism 101 is moved within a range in which the above-noted Expression (4) is satisfied. Thus, it is possible to realize an illumination apparatus with a small outgoing aperture portion, without making the shape of the optical prisms constituting the illumination optical system unnecessarily large. Moreover, the above-described structure does not compromise the changing of the irradiation angle range, so that the irradiation angle range can be changed with relatively high efficiency.

Referring to the cross-sectional view shown in FIG. 18, the following is an explanation of the shape of the flashlight emitting apparatus with regard to the axial direction of the flashlight discharge tube 103. It should be noted that in this drawing, the same numerals are given to members corresponding to those explained for FIGS. 13 to 17.

A characteristic feature of the shape of the second optical prism 2 is that its lateral sides in longitudinal direction are provided with total reflection surfaces 102e and 102e'. Thus, those light rays emitted from the light source that deviate from the necessary irradiation angle range can be guided into the necessary irradiation angle range, and the light from the light source is utilized effectively. Another characteristic feature of the shape of the outgoing surface side of the second optical prism 102 is that in order to prevent that light rays that are reflected by the total reflection surfaces 102e and 102e' and travel in a predetermined direction are adversely effected by the following refraction, the corresponding surfaces 102f and 102f' on the outgoing surface side are planar. Moreover, by making the corresponding surfaces 102 and 102f' planar, the distracting sensation at the seam to the cover 105 of the camera body 26 can be eliminated can be eliminated.

The following is a description of the shape on the outgoing surface side of the other portions of the second optical prism 102. The shape at the region around the central portion (central region 102j) is formed merely as a cylindrical lens having negative refractive power, and the condensing effect in the vertical direction of the apparatus is not adversely affected. Moreover, to the left and right of the central region 102j of the outgoing surface 102b, a plurality of small prism surfaces 102h and 102h' are formed. And in the regions outside the small prism surfaces 102h and 102h', Fresnel lens surfaces 102 and 102i' are formed.

The shape of the above-described outgoing surface 102b increases the condensing ability in the axis direction of the flashlight discharge tube 103 while taking advantage of the condensing ability in the radial direction of the straight tube-shaped flashlight discharge tube 103 shown in FIGS. 13 to 17, and an illumination whose overall condensing ability is very high is realized with these two types of condensing effects.

In this embodiment, an example of an illumination optical system was shown in which the light rays emitted from the light source center are condensed/diverged and the irradiation angle is changed by the interaction of the first optical prism 101 and the second optical prism 102.

However, the illumination optical system of the present invention is not limited to the shape of the illumination optical system of the present embodiment. For example, in the present embodiment, a concave cylindrical lens is used for the outgoing surface 101b of the first optical prism 101, but it is also possible to configure this outgoing surface 101b with a Fresnel lens having negative refractive power. Moreover, also the other faces of the optical prisms can be substituted by Fresnel lenses.

The present embodiment has been explained based on the premise that the reflective surfaces 101d and 101d' of the first optical prism 101 are configured as total reflection surfaces, but they may also be devised as metal vapor deposition surfaces. In this case, the limit for the angle of the rays incident on the reflection surface becomes smaller, so that it is possible to condense the light rays from the light source more efficiently and with a smaller structure.

Moreover, the reflection screen 104 is formed as a semi-circular tube-shaped portion 104a that is concentric to the center of the flashlight discharge tube 103, but there is no limitation to this shape (semi-circular tube-shaped surface), and it is also possible to use a second-order surface, such as an elliptical surface. If the reflection screen has an elliptical surface, then the reflection screen can be made smaller in the vertical direction of the apparatus.

Embodiment 4

Referring to FIGS. 20 to 26, the following is a description of a flashlight emitting apparatus (illumination apparatus) according to Embodiment 4 of the present invention. The flashlight emitting apparatus of this embodiment is of the type in which the irradiation angle can be varied.

Figure 20:
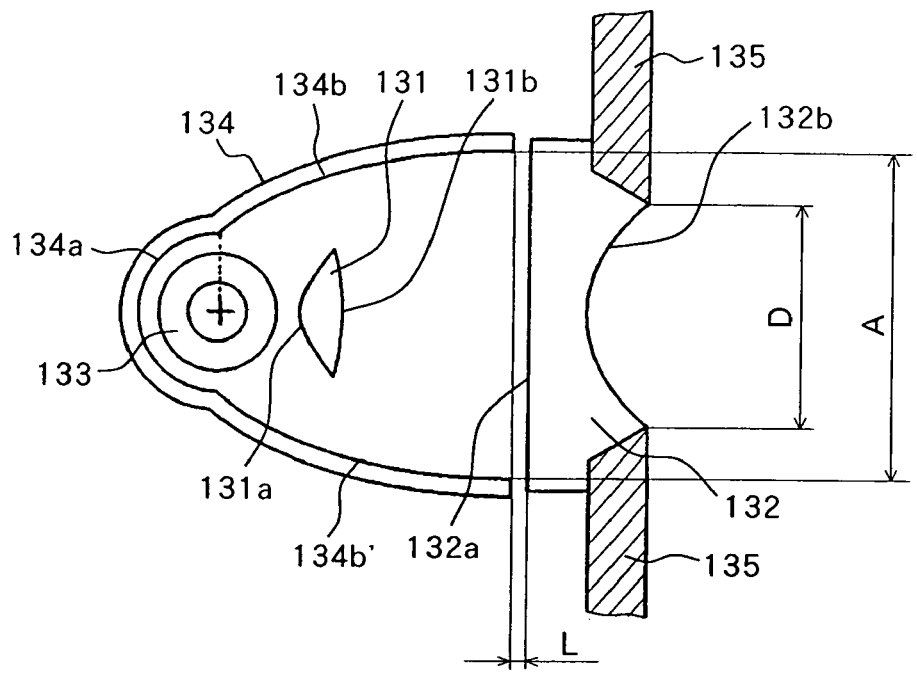
FIG. 20 is a cross-sectional view of a flashlight emitting apparatus according to Embodiment 4 of the present invention, taken along the radial direction of the flashlight discharge tube (condensing state).
Figure 21:
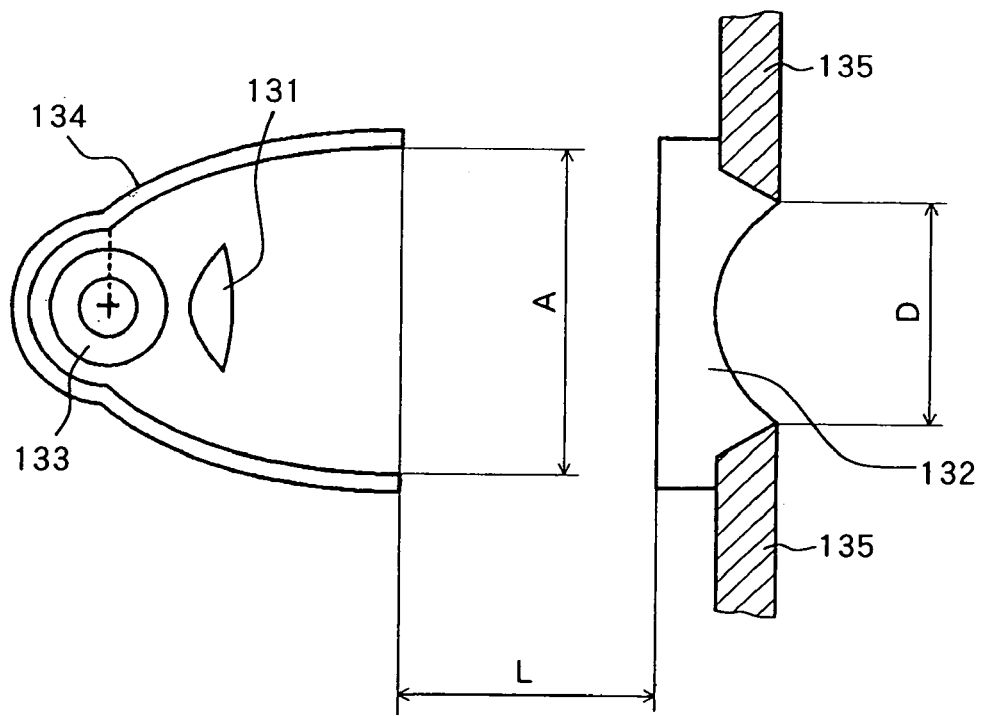
FIG. 21 is a cross-sectional view of a flashlight emitting apparatus according to Embodiment 4 of the present invention, taken along the radial direction of the flashlight discharge tube (divergent state).
Figure 22:
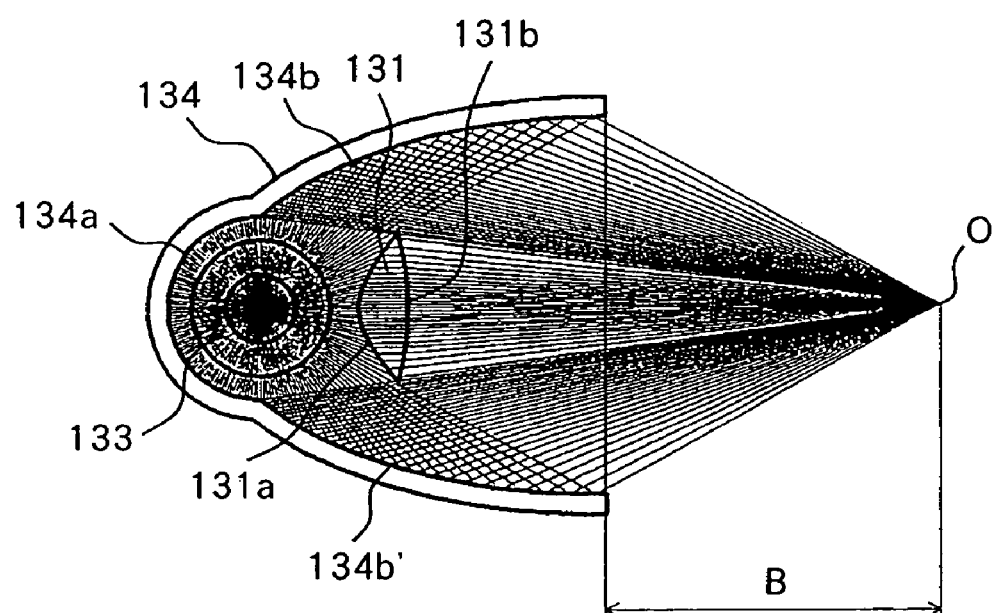
FIG. 22 is a diagram illustrating the concept behind the shape of the condensing optical system in Embodiment 4 of the present invention.
Figure 23:
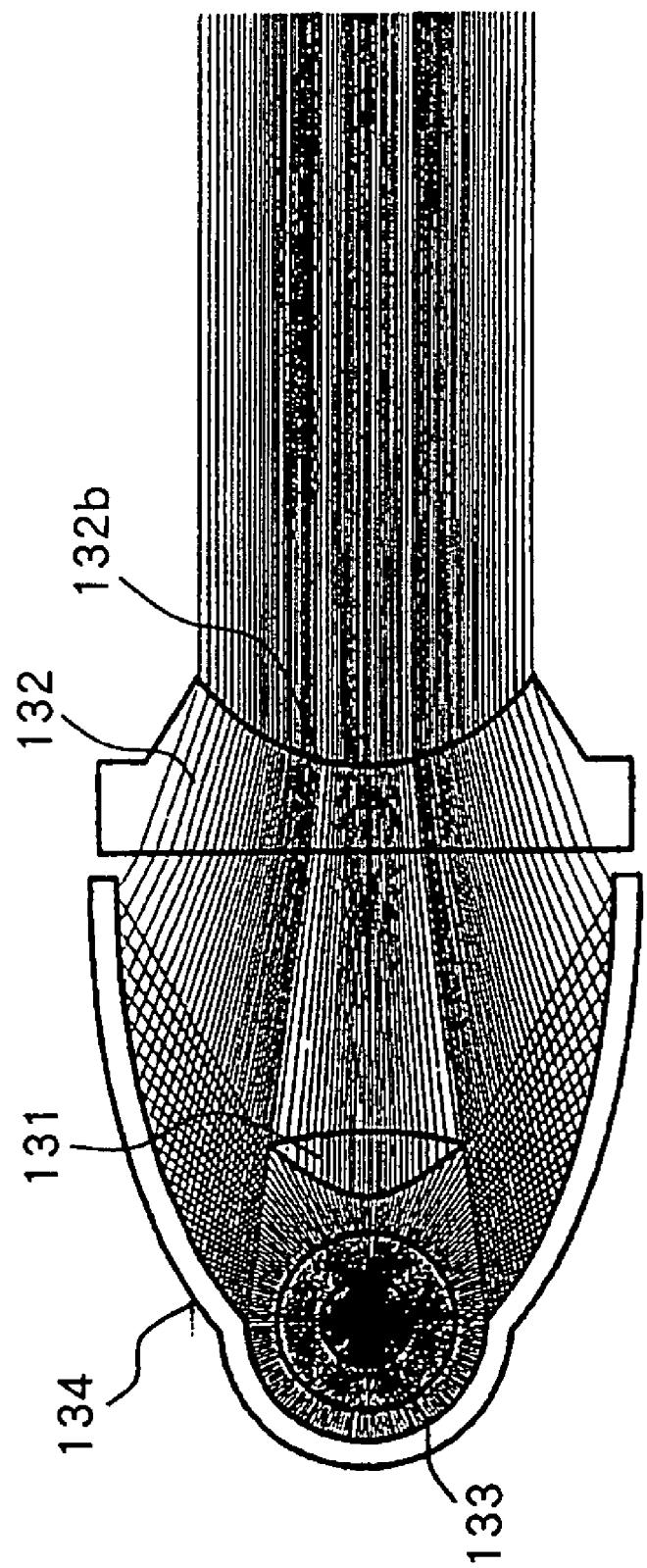
FIG. 23 is a diagram showing the distribution of light rays from the light source in Embodiment 4 of the present invention (condensing state).
Figure 24:
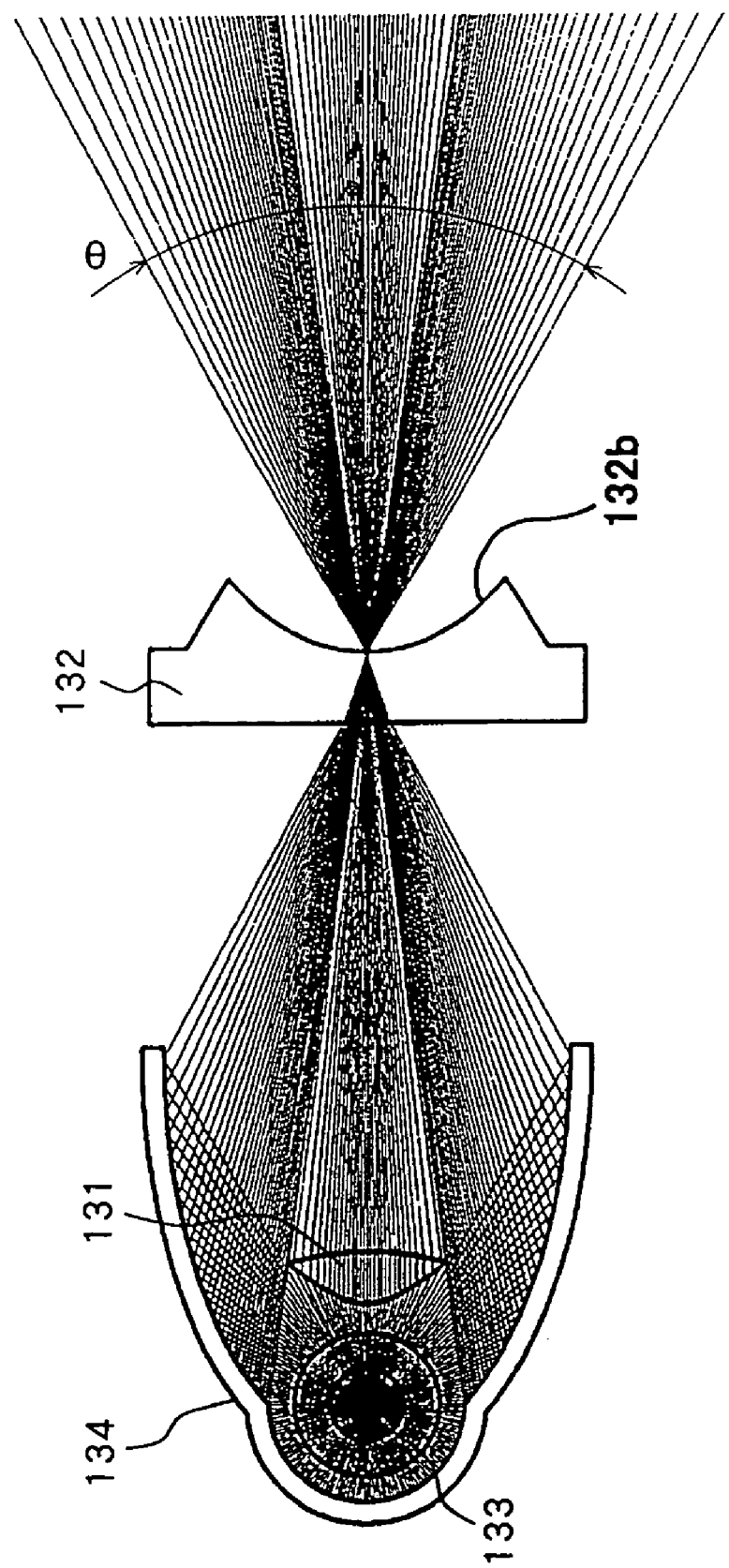
FIG. 24 is a diagram showing the distribution of light rays from the light source in Embodiment 4 of the present invention (divergent state).
Figure 25:
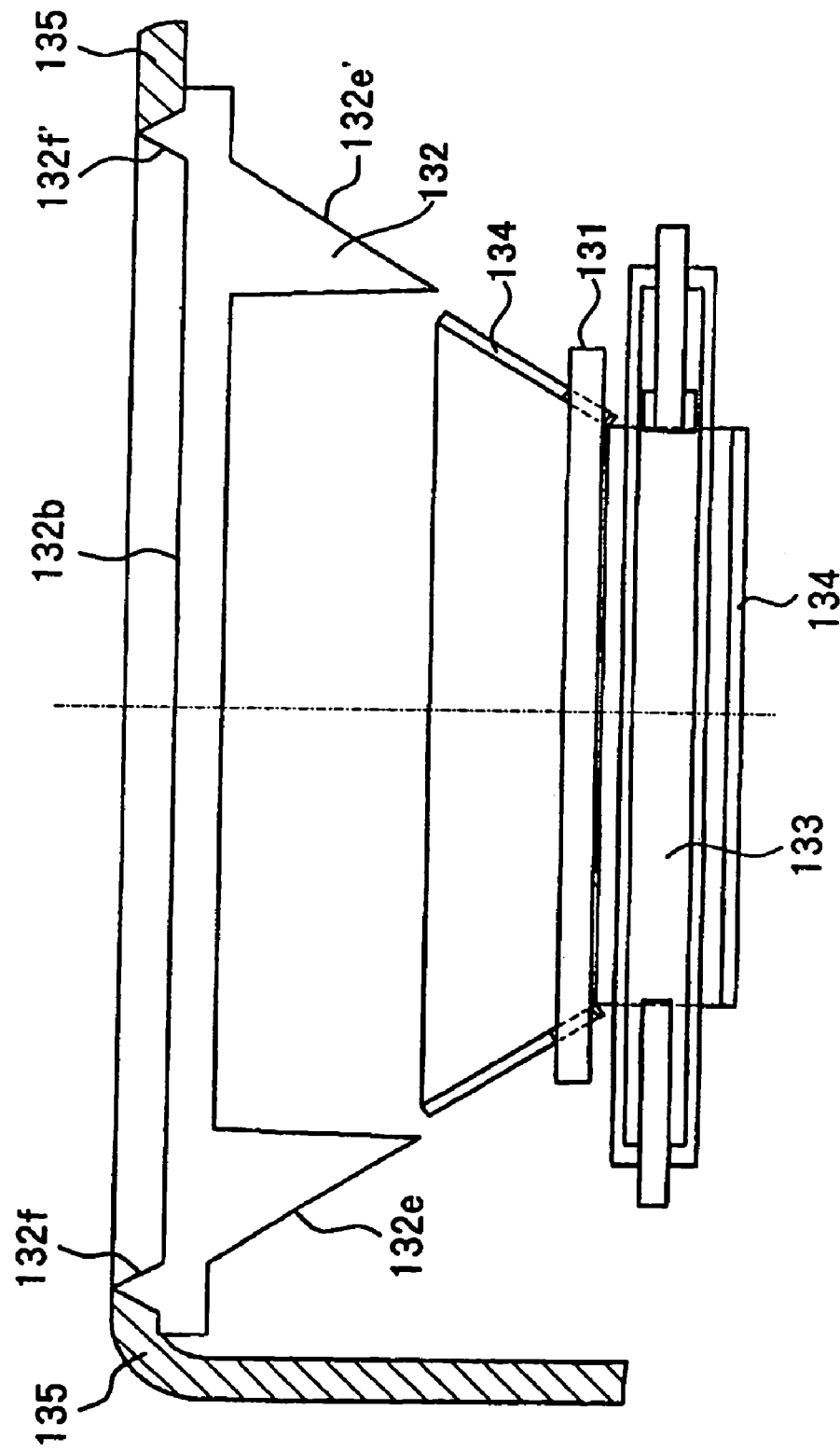
FIG. 25 is a cross-sectional view of a flashlight emitting apparatus according to Embodiment 4 of the present invention, taken along the longitudinal direction of the flashlight discharge tube.
Figure 26:
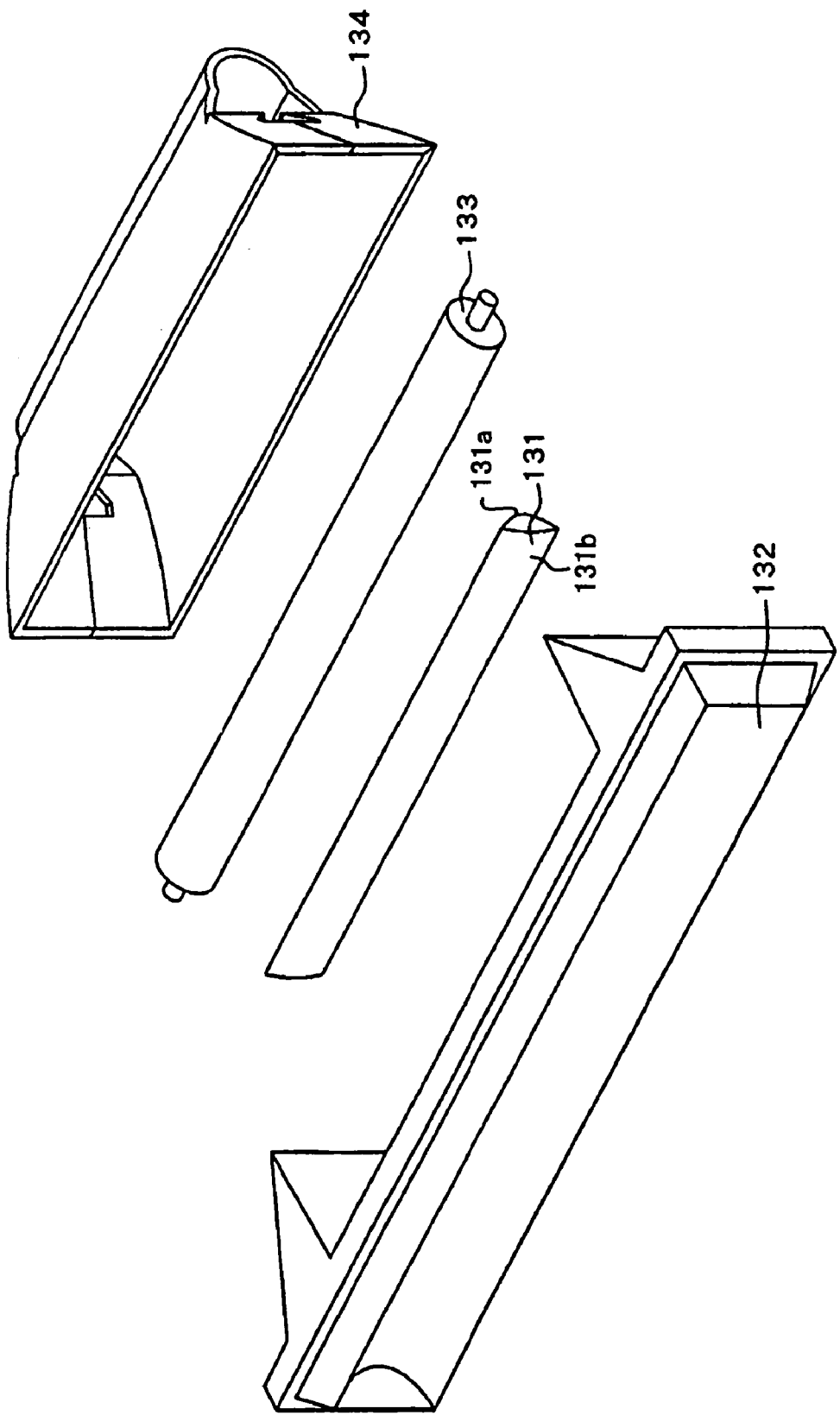
FIG. 26 is an exploded perspective view showing the structure of the essential components of the flashlight emitting apparatus according to Embodiment 4 of the present invention.

FIGS. 20 and 21 are cross-sectional views of the flashlight emitting apparatus, along the radial direction of the flashlight discharge tube. FIG. 22 illustrates the shape of the condensing optical system. FIGS. 23 and 24 are diagrams in which ray tracing of the light emitted from the light source center has been added to the cross-sectional views of FIG. 20 and 21. FIG. 25 is a cross-sectional view of a flashlight emitting apparatus along the axial direction (longitudinal direction) of the flashlight discharge tube. FIG. 26 is an exploded perspective view showing the structure of the essential components of the flashlight emitting apparatus.

FIG. 26, which is an exploded perspective view illustrating the internal structure of the flashlight emitting apparatus, shows the essential portions of the illumination optical system, but does not show holding members or lead wires.

In FIG. 26, numeral 131 denotes a cylindrical lens having positive refractive power that is arranged on the light source side of the flashlight emitting apparatus. The two faces 131a and 131b of this cylindrical lens 131 are convex surfaces. Numeral 132 denotes an optical prism that is arranged on the outgoing side of the flashlight emitting apparatus. The cylindrical lens 131 and the optical prism 132 are made of a glass material or optical resin material with high transmittivity such as acrylic resin.

Numeral 133 denotes a straight tube-shaped flashlight discharge tube (xenon tube) that emits flashlight when a trigger signal is input into it. Numeral 134 denotes a reflection screen that reflects to the emission side (to the front of the apparatus) those components of the light rays emitted from the flashlight discharge tube 133 that have been emitted to the rear or to the side of the apparatus. The inner side (reflection surface) of this reflection screen 134 is made of a metallic material having high reflectivity, such as brilliance aluminum or the like.

Different to Embodiment 3, in the flashlight emitting apparatus of this embodiment, the condensing optical system that condenses the light rays emitted from the light source substantially on one point includes an additional optical system. That is to say, in Embodiment 3, the light rays emitted from the light source are condensed substantially on one point (the focus point) using a single component, namely the first optical prism, arranged on the light source side, whereas in this embodiment, the light rays are condensed on substantially one point (the focus point) using two components, namely the cylindrical lens 131 and the reflection screen 134.

The flashlight emitting apparatus of this embodiment is provided in a camera as described in Embodiment 1 (FIG. 6). In the following, members that are the same as those described in FIG. 6 are given the same numerals.

Referring to FIGS. 20 to 24, the following is a more detailed description of a method for setting the most suitable shape of the illumination optical apparatus.

FIGS. 20 to 24 are vertical cross-sectional views of the flashlight emitting apparatus, taken along the radial direction of the flashlight discharge tube. In these drawings, numeral 131 denotes the cylindrical lens (positive lens portion), which has positive refractive power, for condensing the light rays emitted from the light source center on substantially one point on the optical axis with regard to this cross section. Numeral 132 denotes the optical prism, which has negative refractive power and which is arranged further to the outgoing surface side than the cylindrical lens 131.

Numeral 133 denotes a tube-shaped flashlight discharge tube that emits flashlight when a trigger signal is input into it. Numeral 134 denotes a reflection screen having a semi-circular tube portion 134a that is concentric to the flashlight discharge tube 133, and elliptical portions (reflection portions) 134b and 134b' that condense light rays emitted from the light source center on substantially one point. Here, the condensing optical system is made of the cylindrical lens 131 and the reflection screen 134. Numeral 135 denotes a cover serving as an outer member of the camera body 26.

As shown in the drawings, the optical prism 132 is fastened integrally to the cover 135 by gluing or the like. On the other hand, the cylindrical prism 131 is fastened to the flashlight discharge tube 133 and the reflection screen 134 by a holding member (not shown in the drawings) in a state in which a predetermined positional relation to those members is preserved. Moreover, the unit made of the cylindrical prism 131, the reflection screen 134 and the flashlight discharge tube 133 can be moved in the optical axis direction by a driving mechanism, which is not shown in the drawings.

In the present embodiment, by moving this unit in the optical axis direction and changing the distance between the unit and the optical prism 132, it is possible to change the irradiation angle of the light rays (illumination light) irradiated from the flashlight emitting apparatus.

FIGS. 20 and 23 show the optical arrangement in the flashlight emitting apparatus of this embodiment when the light rays emitted from the light source are condensed the most, that is, when the irradiation angle range is the narrowest. On the other hand, FIGS. 21 and 24 show the optical arrangement in the flashlight emitting apparatus of this embodiment when the light rays emitted from the light source diverge uniformly, that is, when the irradiation angle range is the broadest.

In addition to the cross sections of FIGS. 20 and 21, FIGS. 23 and 24 also show the tracing of representative light rays emitted from a radially central portion of the flashlight discharge tube 133, and illustrate the distribution of the light rays emitted from the light source center as they travel toward the object. It should be noted that in FIGS. 20 to 24, apart from positional relation in the optical axis direction, the structure and shape of the illumination optical system is the same.

The flashlight emitting apparatus of the present embodiment is an illumination optical system in which, by combining the condensing optical system made of the reflection screen 134 and the cylindrical lens 131 with the optical prism 132 having negative refractive power, the irradiation angle range can be gradually changed while keeping the light distribution characteristics uniform. Moreover, the most important characteristic feature of the present embodiment is that the size of the aperture portion, in the vertical direction of the apparatus, can be minimized, as in Embodiment 3. The following is a detailed description of the characteristics of the shape of the illumination optical system and the behavior of the light rays that are emitted from the flashlight discharge tube 133.

The behavior of the light rays in an actual illumination optical system is described in detail using the ray tracing diagram shown in FIGS. 23 and 24. First, the condensing optical system condensing the light rays emitted from the light source on substantially one point (focus point), which can also be said to be the most significant characteristic feature of the present embodiment, is described in detail with reference to FIG. 22. FIG. 22 shows the state when the optical prism 132 has been removed from the illumination optical system shown in FIGS. 23 and 24, and shows a ray tracing diagram of the light rays emitted from the light source center.

As shown in FIG. 22, the cylindrical lens 131 condenses the light rays emitted basically from the light source center substantially on one point (focus point) O on the optical axis. The shape of the various parts of the condensing optical system of the present embodiment is described in detail in the following.

First, those components of the light rays emitted from the light source center for which the angle formed with the optical axis is small are incident on the cylindrical lens 131, whose two faces (131a and 131b) are convex, that is provided on the light source side. Then, the light rays that have passed through the cylindrical lens 131 are condensed onto the focus point O. Moreover, after the components that form a large angle with the optical axis have been reflected by the reflection surfaces 134b and 134b' of the reflection screen 134, they are also condensed on the focus point O. That is to say, the reflection surfaces 134b and 134b' are formed with elliptical surfaces, taking the light source center and the focus point O as the foci.

On the other hand, those components of the light rays emitted from the light source center that are emitted toward the rear of the apparatus are reflected by the reflection screen 134. The reflection screen 134 has a semi-circular tube portion 134a that is concentric to the tube-shaped flashlight discharge tube 133, so that the light rays that are reflected by the semi-circular tube portion 134a of the reflection screen 134 are guided back to the vicinity of the center of the flashlight discharge tube 133. After that, they are condensed onto the focus point O, taking the same optical path as the light rays traveling toward the emission direction from the light source center, as described above. As a result, basically all light rays emitted from the light source center are condensed on the focus point O on the optical axis. Moreover, FIG. 22 shows that the light rays emitted from the light source center reach the focus point O without crossing one another.

The size of the cylindrical lens 131 is set such that the light rays reflected at the reflection screen 134 do not enter the cylindrical lens 131. That is to say, after the light rays emitted from the light source center have been reflected by the reflection surfaces 134b and 134b', they travel toward the focus point O, but the size of the cylindrical lens 131 is determined such that it does not interfere with the light rays.

Thus, by devising the shapes of the various surfaces of the condensing optical system in this manner, it is possible to configure a condensing optical system that is suitable for configuring an illumination optical system with which the irradiation angle range can be varied, as described below.

Referring to FIGS. 23 and 24, the following is a description of the structure of the flashlight emitting apparatus of the present embodiment, with which the irradiation angle can be changed.

FIG. 23 shows the state in which the light rays emitted from the flashlight emitting apparatus are condensed the most. In this state, the cylindrical lens 131 and the optical prism 132 are closest to each other.

On the other hand, the outgoing surface (negative lens portion) 132b of the optical prism 132 is configured by an extremely concave cylindrical lens, so that light rays refracted by this surface will travel in a direction substantially parallel to the optical axis. By arranging the optical prism 132 such that the outgoing surface 132b is positioned more on the light source side than the focus point O shown in FIG. 22, the light rays from the light source can be emitted with high condensing efficiency from the outgoing surface 132b.

The state shown in FIG. 23 is the most extreme state, and by converting all of the light rays emitted from the light source center into light rays that are parallel to the optical axis, it is possible to attain the state in which the irradiation angle range is narrowest and the condensing degree is the highest.

On the other hand, FIG. 24 is a diagram showing the state when the cylindrical lens 131 and the optical prism 132 are spaced apart by a certain distance. As shown in FIG. 24, by increasing the distance between the cylindrical lens 131 and the optical prism 132, it is possible to change from the most condensed state shown in FIG. 25 to a state in which the light rays emitted from the light source center are broadened by an irradiation angle range θ, as shown in FIG. 24.

FIGS. 23 and 24 respectively show the states with the narrowest and the broadest irradiation angle range, but the irradiation angle range of the flashlight emitting apparatus of this embodiment are not limited to these two states. That is to say, by stopping the condensing optical system at a suitable position, and changing the distance between the cylindrical lens 131 and the optical prism 132, it is possible to set the irradiation angle range to any range between the state shown in FIG. 23 and the state shown in FIG. 24. Moreover, during the movement stroke of the condensing optical system (including the cylindrical lens 131), there is no position at which the light distribution characteristics (irradiation angle range) are discontinuous, and it is possible to convert the light emitted from the light source such that it has a uniform light distribution at any position of the condensing optical system.

Thus, by arranging the optical prism 132 having a negative refractive power at a position that is closer to the light source side than the focus point O that is formed by the light rays emitted from the cylindrical lens 131, and by changing the positional relation of the cylindrical lens 131 and the optical prism 132 on the optical axis, it is possible to change the irradiation angle range.

As can be seen from FIGS. 23 and 24, the change of this irradiation angle range is determined by the position of the outgoing surface 132b (concave lens surface) of the optical prism 132 with respect to the focus point O. That is to say, as shown in FIG. 23, a high condensing ability can be obtained when the light rays emitted from the light source pass through all of the regions of the outgoing surface 132 of the optical prism 132.

Furthermore, as shown in FIG. 24, when the light rays pass only through a region of the outgoing surface 132b with small curvature near the optical axis, then the irradiation angle range is broadened by weakening the condensing effect, and uniform light distribution characteristics can be attained over this broad range.

On the other hand, as shown in FIGS. 20 to 24, the aperture portion serving as the emission region of the optical prism 132 becomes narrower than the aperture portion serving as the emission region of the reflection screen 134, and from immediately before entering the condensing optical system until immediately after leaving the optical prism 132, the irradiation angle range becomes extremely narrow. For this reason, the light rays can be emitted with high condensing efficiency from a narrow outgoing aperture portion of the illumination optical system.

Moreover, as in Embodiment 3, the outgoing surface 132 of the optical prism 132 is configured not as a complicated surface but as a continuously curved surface. Thus, machining of the outgoing surface 132b becomes easy, and discrepancies due to machining precision or positional shifts when assembling the illumination optical system do not occur. That is to say, it seems that even when the position of the light rays that reach the outgoing surface 132b is slightly shifted, this has no significant influence on the optical characteristics and consistent optical characteristics without light distribution irregularities can be attained, because there are no discontinuities in the outgoing surface 132b, and there are no changes in the surface shape.

The above is also the same when assuming that the size of the light source has a certain constant size, so that considerable changes in the optical characteristics also tend not to occur and continuous changes in the optical characteristics are attained with respect to changes in the size of the light source. Thus, this structure is advantageous for providing illumination optical systems with a uniform light distribution.

Moreover, the outgoing surface 132b of the optical prism 132 is not made of a complicated surface, but of a single concave surface, so that, in addition to the above-described effects, there is the advantage that it can also be used directly as an external component of the flashlight emitting apparatus.

Referring to FIGS. 20 and 21, the following is a description of the ideal shape of the illumination optical system of the present embodiment. FIGS. 20 and 21 are cross-sectional views of a flashlight emitting apparatus taken along the radial direction of the flashlight discharge tube 133 and show the positional relation between a cover 135 of the camera body 26 and the illumination optical system.

As illustrated in FIGS. 23 and 24, it is the outgoing surface 132b of the optical prism 132 that functions as the outgoing surface of the illumination optical system, so that the cover 135 is formed such that also at the outgoing aperture portion of the illumination optical system of the camera, only this portion is exposed to the outside of the camera. Thus, the size, with respect to the vertical direction of the camera, of the outgoing aperture portion of the illumination optical system can be made such that it looks the smallest, and the characteristic features of the present embodiment can be utilized best.

On the other hand, the reflection screen 134 is made of the semi-circular tube portion 134a and the semi-elliptical portion 134b, and the border between the semi-circular tube portion 134a and the semi-elliptical portion 134b is at a position that substantially matches the position in the axial direction that corresponds to the light source center. The reason for this is that if the position of the border at which the shape of the reflection screen 134 changes is further to the front of the apparatus than the light source, then a portion of the light rays reflected at the semi-circular tube portion 134a is returned to the rear of the apparatus behind the light source, so that the light rays emitted from the light source cannot be condensed with high efficiency.

Moreover, if the position of the border is arranged further to the rear of the apparatus than the position corresponding to the light source center, so that the light rays reflected by the reflection screen 134 do not interfere with the flashlight discharge tube 133 and the cylindrical lens 131, then the reflection screen 134 becomes very large with regard to the optical axis direction, and miniaturization of the illumination optical apparatus, which is one of the objects of the present embodiment, is not attained.

For these reasons, it is preferable with regard to the condensing efficiency and the size of the illumination optical system that the position of the border in the reflection screen 134 substantially matches the position corresponding to the light source center.

The following is an explanation of the ideal shape of the optical prism 132. First, the ideal shape of the dimensions in vertical direction of the illumination optical system is explained.

In FIG. 20, it is preferable that the aperture height D of the outgoing surface 132b of the optical prism 132 is within the range of the Expression (5) below. That is, the ratio between the aperture height D of the outgoing surface 132b of the optical prism 132 and the aperture height A of the reflection surfaces 134b and 134b' of the reflection screen 134 is given by:

$$0.4 \leq D/A \leq 0.8 \tag{5}$$

In order to adapt to new camera designs, it would be ideal to make the aperture height D as small as possible, but depending on the size (aperture) of the flashlight discharge tube 133 serving as the light source, the light loss becomes larger as the aperture height D becomes smaller, and it may not be possible to configure an effective condensing optical system.

That is to say, if the aperture height D of the outgoing surface 132b in the vertical direction of the apparatus is reduced, and the size of the light source (diameter of the flashlight discharge tube 133) is increased, the light rays that travel directly to the outgoing surface 132b of the optical prism 132 are reduced. Thus, most of the components that would have been emitted from the outgoing surface 132b are emitted from other portions of the optical prism 132, and those components of the light rays emitted from the light source that can be used effectively for the illumination of the object are decreased. Consequently, with the above structure, even though the aperture height D in the vertical direction of the apparatus can be reduced, it is still not necessarily an ideal illumination optical system with regard to the effective utilization of light rays emitted from the light source.

With regard to this, the lower limit of Expression (5) is the aperture height D that functions effectively as the illumination optical system, if the diameter of the flashlight discharge tube 133 serving as the light source is relatively small. And the smaller the diameter of the flashlight discharge tube 133 is in the expression, the smaller the aperture height D can be made. However, due to such reasons as the durability and the manufacturing process of the actual flashlight discharge tube 133, there are no flashlight discharge tubes 133 below a certain diameter.

Considering the inner diameter of flashlight discharge tubes 133 that can be manufactured in practice, then a lower limit for the aperture ratio (D/A) of 0.4 seems appropriate.

On the other hand, if the upper limit 0.8 for the aperture ratio in Expression (5) is exceeded, then the aperture height D becomes large, which is not desirable with regard to the object of the present embodiment, namely to reduce the size of the outgoing aperture portion of the flashlight emitting apparatus in the vertical direction of the apparatus.

The following is a discussion of actual numbers for Expression (5) in a flashlight emitting apparatus according to the present embodiment. In the present embodiment, the diameter (inner diameter) of the flashlight discharge tube 133 is φ1.0 mm, the maximum height A of the total reflection surfaces 134*d* and 134*d'* of the reflection screen 134 is 5.6 mm, and the aperture height D of the outgoing surface 132*b* of the optical prism 132 is 3.8 mm. From these numbers, it follows that the value of the aperture ratio of Expression (5) is 0.68, which falls into the range of Expression (5).

The following is an explanation of the positional relation in the axial direction of the illumination optical system. When L is the distance between the outgoing surface of the reflection screen 134 (tips of the reflection screen 134) and the ingoing surface 132*a* of the optical prism 132, and B is the distance between the outgoing surface 134 and the focus point O as shown in FIG. 22, then it is preferable that the ratio of the distance L and the distance B satisfies the following Expression (6):

$$0 \leq L/B \leq 1.0 \qquad (6)$$

With regard to making the illumination optical system small, the distance L is ideally as short as possible. However, a certain length (L) is necessary in order to make the aperture height D of the outgoing surface 132*b* of the optical prism 132 narrow.

In the present embodiment, considering these aspects, the distance L and the distance B are set such that the Expression (6) is satisfied.

The lower limit 0 in Expression (4) means the state when the reflection screen 134 and the optical prism 132 are in contact, and this lower limit cannot be undercut. On the other hand, the upper limit is set to 1.0, because when a larger value is taken, then the illumination optical system becomes large in the optical axis direction, and the goal of making the illumination optical system smaller, which is one of the results of the present embodiment, is missed. Moreover, when the distance between the reflection screen 134 and the optical prism 132 is L/B>1.0, then the light rays directed toward the central region of the outgoing surface 132*b* become very few, and preferable light distribution characteristics is not likely to be obtained.

The following is a discussion of actual numbers for Expression (6) in a flashlight emitting apparatus according to the present embodiment. In the present embodiment, the distance L (maximum distance between the reflection screen 134 and the optical prism 132) is 4.4 mm and the distance B is 5 mm. From these numbers, it follows that L/B is 0.88, which is within the range of Expression (6).

In the present embodiment, the ingoing surface 132*a* of the optical prism 132 is planar, and the outgoing surface of the 132*b* of the optical prism 132 is concave, but there is no limitation to these surface structures, and the ingoing surface 132*a* may also be a convex or a concave surface. Here, by making the ingoing surface 132*a* a concave surface, there is the advantage that it is possible to soften the refractive power of the concave surface of the outgoing surface 132*b*, making it possible to avoid a concave lens with a large drop of the outgoing surface 132*b*, but on the other hand there is the disadvantage that the outgoing surface 132*b* is broadened. In any case, the optical prism 132 needs to be configured such that the outgoing surface 132*b* is a concave surface, and that the overall optical prism 132 has a negative refractive power.

With the above structure, it is possible to realize an illumination apparatus in which the outgoing aperture portion in the vertical direction of the apparatus can be made small, without making the reflective screen 134 constituting the illumination optical system unnecessarily large. Moreover, the above-described structure does not compromise the changing of the irradiation angle range, so that the irradiation angle range can be changed with relatively high efficiency.

Referring to the cross-sectional view shown in FIG. 25, the following is an explanation of the shape of the flashlight emitting apparatus with regard to the axial direction of the flashlight discharge tube. It should be noted that in this drawing, the same numerals are given to members corresponding to those explained for FIGS. 20 to 24.

A characteristic feature of the shape of the optical prism 132 is that its lateral sides in longitudinal direction are provided with total reflection surfaces 132*e* and 132*e'*. Thus, those light rays emitted from the light source that deviate from the necessary irradiation angle range can be guided into the necessary irradiation angle range, and the light from the light source is utilized effectively. Another characteristic feature of the shape of the outgoing surface side of the second optical prism 132 is that its two end faces in longitudinal direction are provided with slanted surfaces 132*f* and 132*f'*. Thus, it can be repressed that light rays that are directed within the necessary irradiation angle range escape at the two ends of the outgoing surface 1*b*, and the distracting sensation at the seam with the cover 135 of the camera body 26 can be eliminated.

On the other hand, a cylindrical lens with negative refractive power is formed over the entire central region in longitudinal direction of the outgoing surface 132*b*. Thus, the condensing effect in the radial direction of the flashlight discharge tube 134 is not adversely affected. By making the outgoing surface 132*b* of a cylindrical lens with a single concave surface, there is also the advantage that the camera can be provided with a clear-cut appearance without distracting features.

In this embodiment, an example of an illumination optical system was shown in which the light rays emitted from the light source center are condensed/diverged and the irradiation angle is changed by the interaction of the reflection screen 134, the cylindrical lens 131, and the optical prism 132. However, the structure of the flashlight emitting apparatus of the present invention is not limited to the structure of the flashlight emitting apparatus described in the present embodiment. For example, in the present embodiment, a concave cylindrical lens is used for the outgoing surface 132*b* of the optical prism 132, but it is also possible to configure this outgoing surface 132*b* with a toric lens surface having also a refractive power in the axial direction of the flashlight discharge tube 133 or a Fresnel lens having negative refractive power.

Embodiment 5

Figure 27:
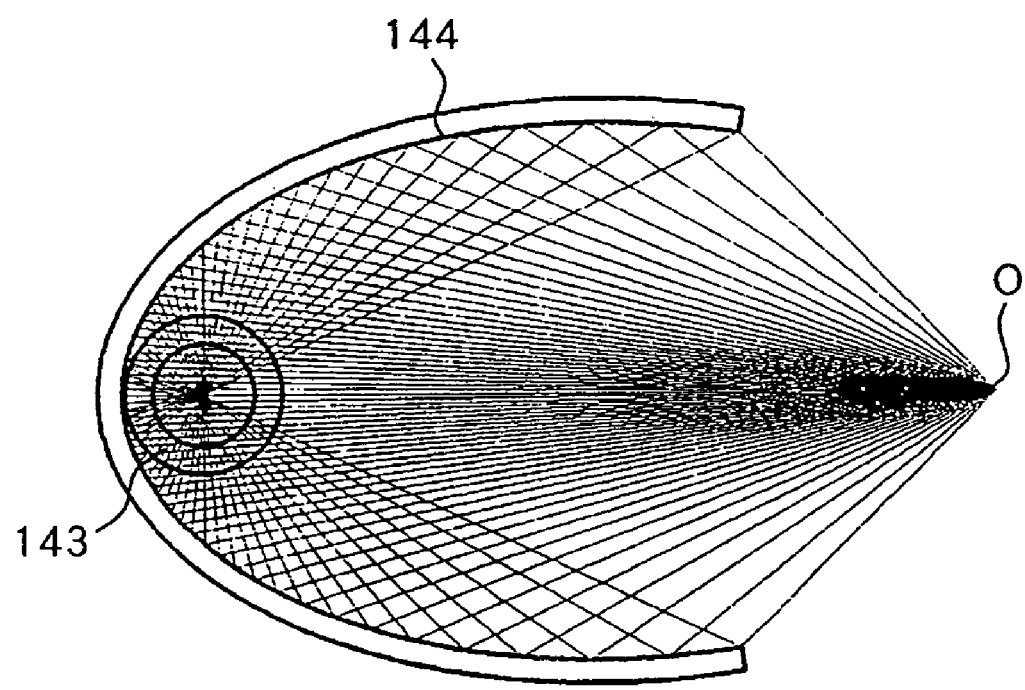
FIG. 27 is a diagram illustrating the concept behind the shape of the condensing optical system according to Embodiment 5 of the present invention.
Figure 28:
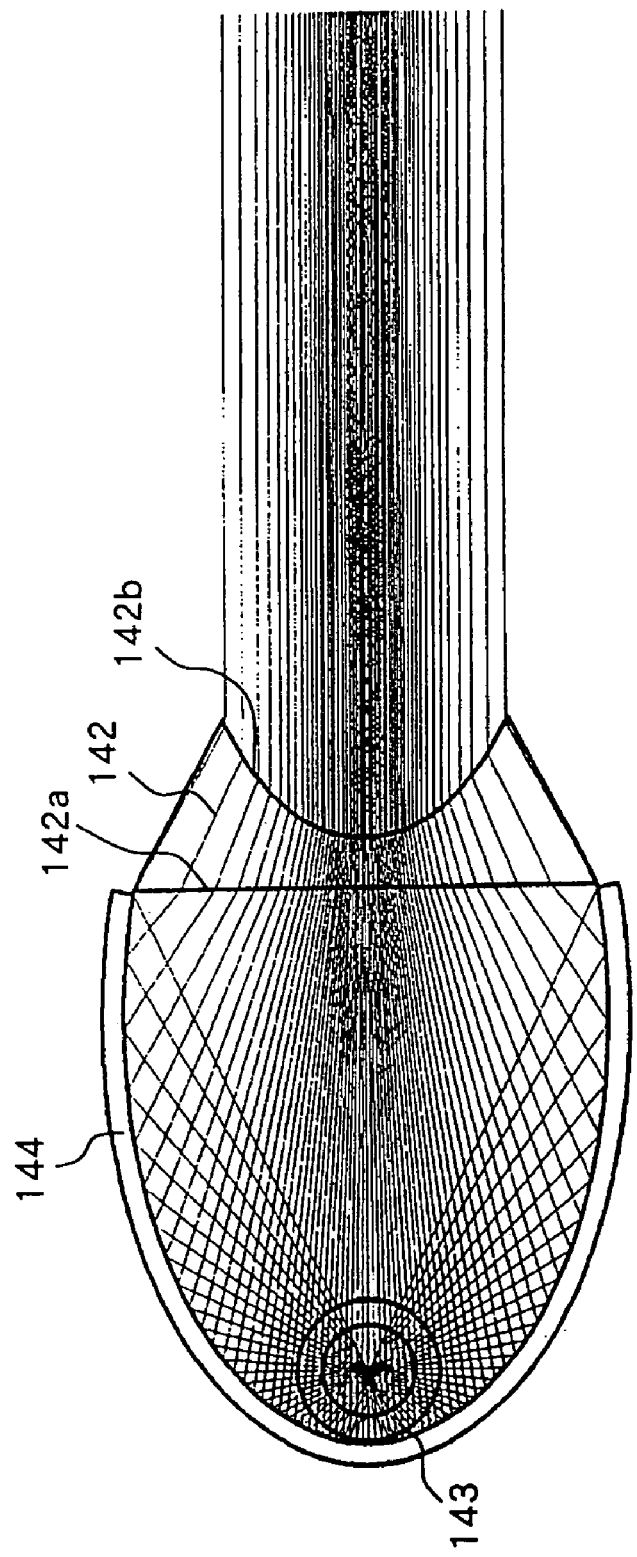
FIG. 28 is a diagram showing the distribution of light rays from the light source in Embodiment 5 of the present invention (condensing state).
Figure 29:
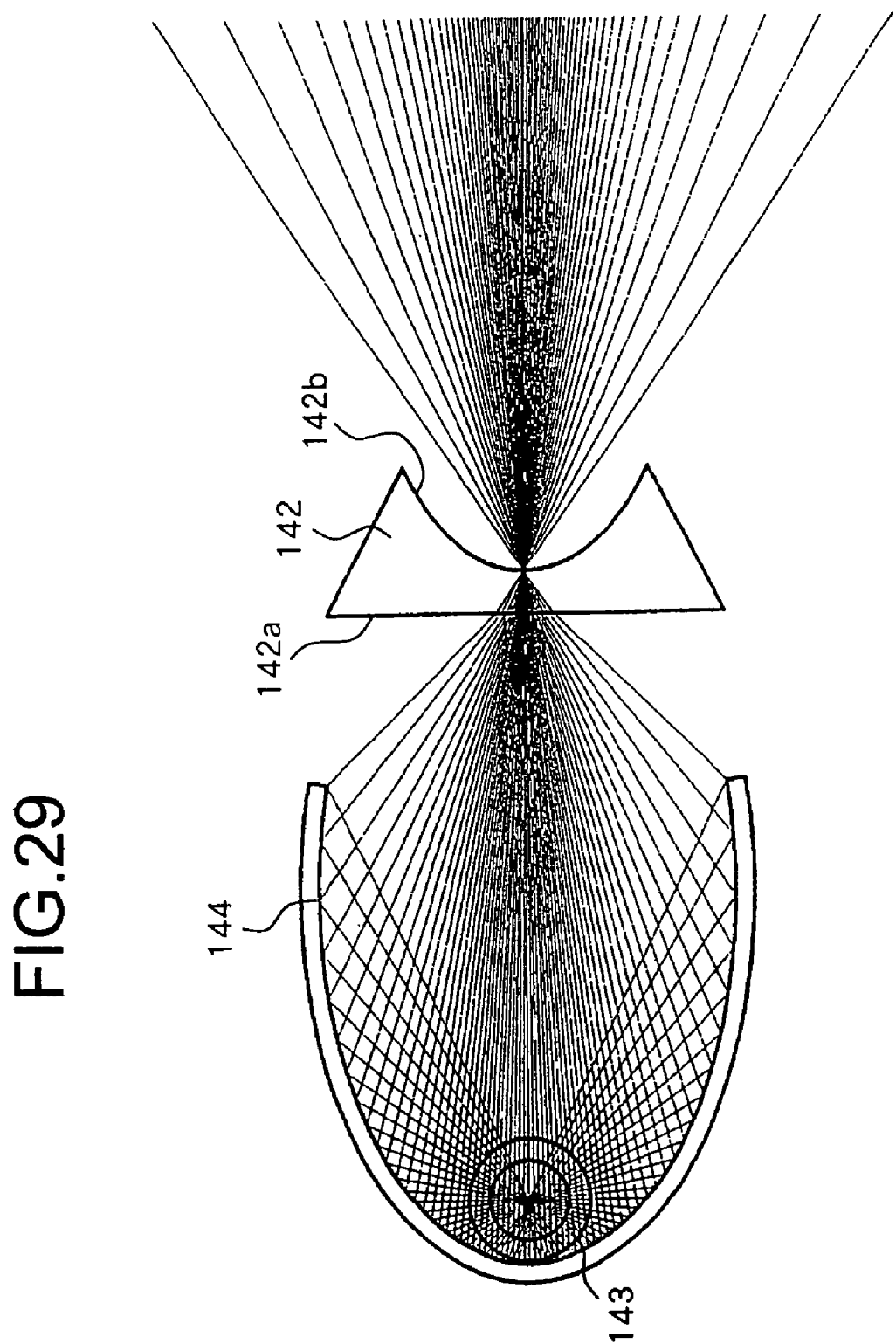
FIG. 29 is a diagram showing the distribution of light rays from the light source in Embodiment 5 of the present invention (divergent state).

Referring to FIGS. 27 to 29, the following is a description of a flashlight emitting apparatus (illumination apparatus) according to Embodiment 5 of the present invention. The flashlight emitting apparatus of this embodiment is of the type in which the irradiation angle can be varied.

FIGS. 28 and 29 are cross-sectional views of the flashlight emitting apparatus, along the radial direction of the flashlight discharge tube, in which ray tracing of the light emitted from the light source center has been added. FIG. 27 is a diagram illustrating the shape of the condensing optical system.

In the flashlight emitting apparatus of this embodiment, the optical prisms made of acrylic resin or the like (that is, the first optical prism 101 in Embodiment 3 or the cylindrical lens 131 in Embodiment 4) that were used in Embodiments 3 and 4 to condense the light rays emitted from the light source on substantially one point (the focus point) are removed, and instead of these optical prisms, a reflection screen is used that has substantially equivalent optical characteristics as the optical prisms. In the present embodiment, the light rays emitted from the light source are condensed on the focus point using only the reflection screen, so that strictly speaking, not all of the light rays emitted from the light source center can be condensed/diverged with high efficiency.

However, since in the present embodiment the above-noted optical prisms have been removed, there are the advantages that the number of components can be reduced, and a cheaper structure becomes possible. Moreover, as noted below, since the light rays emitted from the light source are emitted out of the apparatus after being condensed toward the optical axis, there is the advantage that the outgoing aperture portion of the flashlight emitting apparatus can be made small with regard to the vertical direction of the apparatus.

Referring to FIGS. 27 to 29, the following is a more detailed description of a method for setting the most suitable shape of the illumination optical system of this embodiment.

In FIGS. 28 and 29, numeral 142 denotes an optical prism having negative refractive power that is arranged on the outgoing surface side of the illumination optical system, and that is made of a glass material or optical resin material with high transmittivity such as acrylic resin. Numeral 143 denotes a straight tube-shaped flashlight discharge tube (xenon tube) that emits flashlight when a trigger signal is input into it. Numeral 144 denotes a reflection screen (reflection portion) that reflects to the emission side (to the front of the apparatus) those components of the light rays emitted from the flashlight discharge tube 143 that have been emitted to the rear and to the top or bottom of the apparatus. The inner side (reflection surface) of this reflection screen 144 is made of a metallic material having high reflectivity, such as brilliance aluminum or the like.

Here, as shown in FIG. 27, the reflection screen 144 has an elliptical surface with the light source center as one of the foci, and reflects light emitted from the light source center and condenses it to the focus point O which is the other focus of the ellipse. The flashlight discharge tube 143 and the reflection screen 144 are held integrally in a state in which the flashlight discharge tube 143 matches the focus position of the elliptic surface of the reflection screen 144. The unit made of the flashlight discharge tube 143 and the reflection screen 144 (condensing optical system) can be moved in the optical axis direction, and its spacing to the optical prism 142 arranged on the outgoing surface side of the illumination optical system can be changed. In this manner, the irradiation angle of the illumination optical system can be changed continuously by changing the distance between this unit and the optical prism 142.

In the present embodiment, an aspect that is different to Embodiments 3 and 4 is that, although not shown in the drawings, those light rays emitted from the flashlight discharge tube 143 that are not reflected by the reflection screen 144 but travel directly toward the optical prism 142 are not condensed on the focus point O. Moreover, the light rays emitted from the flashlight discharge tube 143 that are directed toward the rear of the apparatus are reflected by the reflection screen 144 and return to the flashlight discharge tube 143. Here, the reflection surface of the reflection screen 144 is formed as an elliptical surface, as described above, so that different to the foregoing embodiments, the light rays reflected by the reflection screen 144 are all directed in a direction away from the light source center. Moreover, strictly speaking there is refraction at the glass surface of the flashlight discharge tube 143, and the light rays cannot be condensed on the focus point O and are somewhat broadened.

To facilitate explanations, FIGS. 27 to 29 illustrate the ray tracing without showing the influence of the refractions at the flashlight discharge tube 143. It should be noted that it is possible to consider the influence of the refractions at the flashlight discharge tube 143 (glass tube) and to correct the shape of the reflection screen 144 to a suitable shape. This way, the light rays that are emitted from the light source toward the rear of the apparatus can be reflected by the reflection screen 144 and condensed on the focus point O.

As shown in FIG. 28 and 29, in the flashlight emitting apparatus of this embodiment, as in the foregoing embodiment, the outgoing surface (negative lens portion) 142b of the optical prism 142 is devised as a concave surface (having negative refractive power). Moreover, the ingoing surface 142a of the optical prism 142 is formed as a planar surface. Thus, with regard to the positional relation of the illumination optical system as shown in FIG. 28, the light rays from the condensing optical system are refracted by the ingoing surface 142a, and are emitted to the outside of the apparatus after passing through the entire outgoing surface 142b, and the irradiation angle range of the illumination light can be made narrow. Moreover, with the positional relation of the illumination optical system as shown in FIG. 29, the light rays from the condensing optical system are refracted by the ingoing surface 142a, and are emitted to the outside of the apparatus after passing through the central region of the outgoing surface 142b near the optical axis, and the irradiation angle range of the illumination light can be broadened.

Moreover, the outgoing surface 142b of the optical prism 142 can be made very small in the vertical direction of the apparatus with the aperture of the reflection screen 144, and the size of the outgoing aperture portion of the flashlight emitting apparatus in the vertical direction of the camera that is apparent from outside the camera can be made very small, as in Embodiments 3 and 4.

With the above-described structure, it is possible to realize a flashlight emitting apparatus in which the outgoing aperture portion is made small with regard to the vertical direction of the apparatus, while reducing the number of optical elements constituting the illumination optical system. Moreover, also the structure of this embodiment does not compromise the changing of the irradiation angle range, so that the irradiation angle can be changed with relatively high efficiency.

In the present embodiment, an illumination optical system was shown in which the light rays emitted from the light source center can be condensed and diverged with two members, namely the reflection screen 144 and the optical prism 142. However, the present invention is not limited to the shape of the illumination optical system of the present embodiment. For example, in the present embodiment, the outgoing surface 142b of the optical prism 142 was configured as a concave cylindrical lens, but the outgoing surface may also be configured as a Fresnel lens. Moreover, the outgoing surface 142b may also be configured as a toric lens surface having also a refractive power in the axial direction of the flashlight discharge tube 143.

What is claimed is:

1. An illumination apparatus comprising:
a light source; and
a condensing unit that condenses light emitted from the light source toward the optical axis;
wherein the condensing unit includes
a negative lens portion that is arranged on a front side of the apparatus and has negative refractive power, a positive lens portion that is arranged near the optical axis and has positive refractive power, and a reflection portion that reflects emitted light that is not directed to the positive lens portion toward the optical axis, wherein negative lens portion is shaped such that its length in the vertical direction of the apparatus is smaller than a maximum length of the condensing unit in the vertical direction of the apparatus.

2. An illumination apparatus comprising:

a light source; and a condensing unit that condenses light emitted from the light source toward the optical axis;

wherein the condensing unit includes a negative lens portion that is arranged on a front side of the apparatus and has negative refractive power, a positive lens portion that is arranged near the optical axis and has positive refractive power, and a reflection portion that reflects emitted light that is not directed to the positive lens portion toward the optical axis, wherein negative lens portion is shaped such that its length in the vertical direction of the apparatus is smaller than a maximum length of the condensing unit in the vertical direction of the apparatus, wherein the negative lens portion and the condensing unit are formed such that the following expression is satisfied:

$$0.4 \leq D/A \leq 0.8$$

wherein D is the maximum length of negative lens portion in the vertical direction of the apparatus, and A is the maximum length of the condensing unit in the vertical direction of the apparatus.

3. An illumination apparatus comprising:

a light source; and a condensing unit that condenses light emitted from the light source toward the optical axis;

wherein the condensing unit includes a negative lens portion that is arranged on a front side of the apparatus and has negative refractive power, a positive lens portion that is arranged near the optical axis and has positive refractive power, and a reflection portion that reflects emitted light that is not directed to the positive lens portion toward the optical axis, wherein the negative lens portion and the condensing unit are formed such that the following expression is satisfied:

$$0.1 \leq L/B \leq 0.5$$

wherein L is the distance in optical axis direction between a maximum aperture position of the negative lens and a maximum aperture position of the condensing lens, and B is the distance in optical axis direction between a maximum aperture position of the condensing unit and the light source center.

* * * * *